United States Patent
Harney

(10) Patent No.: US 11,263,913 B2
(45) Date of Patent: Mar. 1, 2022

(54) LEARNING NETWORK SYSTEM

(71) Applicant: MIDAS EDUCATION, LLC, Wauwatosa, WI (US)

(72) Inventor: Megan Colleen Harney, Wauwatosa, WI (US)

(73) Assignee: MIDAS EDUCATION, LLC, Wauwatosa, WI (US)

( * ) Notice: Subject to any disclaimer, the term of this patent is extended or adjusted under 35 U.S.C. 154(b) by 250 days.

(21) Appl. No.: 16/244,473

(22) Filed: Jan. 10, 2019

(65) Prior Publication Data

US 2019/0385468 A1    Dec. 19, 2019

Related U.S. Application Data

(62) Division of application No. 14/845,249, filed on Sep. 3, 2015, now abandoned.

(60) Provisional application No. 62/045,805, filed on Sep. 4, 2014.

(51) Int. Cl.
    *G09B 5/06*    (2006.01)
(52) U.S. Cl.
    CPC ..................... *G09B 5/06* (2013.01)
(58) Field of Classification Search
    CPC ......... G06Q 50/205; G09B 5/00; G09B 19/00
    See application file for complete search history.

(56) References Cited

U.S. PATENT DOCUMENTS

| | | |
|---|---|---|
| 4,419,080 A | 12/1983 | Erwin |
| 8,326,211 B1 | 12/2012 | Hillier et al. |
| 2002/0178038 A1 | 11/2002 | Grybas |
| 2004/0153509 A1 | 8/2004 | Alcorn et al. |
| 2005/0106549 A1* | 5/2005 | Parija ..................... G09B 19/00 434/362 |
| 2006/0105315 A1* | 5/2006 | Shaver ............. G06Q 10/06315 434/362 |
| 2006/0143061 A1* | 6/2006 | Sharper .................. G06Q 10/10 705/7.39 |
| 2007/0238077 A1 | 10/2007 | Strachar |
| 2008/0131852 A1 | 6/2008 | Van Hofwegen |
| 2009/0162828 A1 | 6/2009 | Strachan et al. |
| 2009/0327053 A1 | 12/2009 | Niblock |
| 2012/0308970 A1 | 12/2012 | Gillespie et al. |
| 2015/0058055 A1* | 2/2015 | Blodgett .......... G06Q 10/06311 705/7.13 |

(Continued)

*Primary Examiner* — Peter R Egloff

(74) *Attorney, Agent, or Firm* — Merchant & Gould P.C.

(57) ABSTRACT

Apparatuses, components, methods, and techniques for facilitating learning and managing an educational environment are provided. In an example, the system includes at least one processing device and at least one computer-readable storage device storing data instructions. The data instructions cause the at least one processing device to generate an online educational portal, the online educational portal including a student information system, a class scheduler engine and at least one of a presentation module, a searchable directory of curricular resources, and an analytics engine. The class scheduler engine is configured to generate class schedules. The presentation module operates to display information about various school entities. The analytics engine operates to evaluate relationships between activities users have engaged in and assessed skills of those users in various other activities.

13 Claims, 12 Drawing Sheets

(56) References Cited

U.S. PATENT DOCUMENTS

2015/0356699 A1* 12/2015 Velozo .................. G06Q 50/20
705/326
2016/0071424 A1 3/2016 Harney et al.

* cited by examiner

Teacher Info

5756: Cynthia Bazinet

FTE
full year          9    9

← 370

Courses

AP Lang-1
No. Requests:     144
Min. Size:         10
Max. Size:         20
No. Sections:       7
No. Other Teachers: 2
    Natalie Layte
    Kaitlin Senior Eng 4A
No. Requests:      52
Min. Size:         10
Max. Size:         30
No. Sections:       2
No. Other Teachers: 2
    James Adams
    Christine MacGrory Eng 4AH
No. Requests:      77
Min. Size:         10
Max. Size:         30
No. Sections:       3
No. Other Teachers: 2
    Christine MacGrory
    MaryBeth Philbin-Hannigan Eng 4B
No. Requests:      51
Min. Size:         10
Max. Size:         30
No. Sections:       2
No. Other Teachers: 2
    James Adams
    Christine MacGrory Eng 4BH
No. Requests:      77
Min. Size:         10
Max. Size:         30
No. Sections:       3
No. Other Teachers: 2
    Christine MacGrory
    MaryBeth Philbin-Hannigan

Student Info

6800: Tee Belog

AP Eng Language
AP Eng Language
AP Eng Language
AP Physics I
AP Physics I
AP Physical
AP US History
AP US History
AP US History
Journalism
Empowering Young Women
Band Trip
Honors Pre-Cal A
Honors Pre-Cal B
Intro to Music & Theater

*FIG. 11*

LEARNING NETWORK SYSTEM

CROSS REFERENCE TO RELATED APPLICATION

This application is a divisional application of U.S. patent application Ser. No. 14/845,249, filed Sep. 3, 2015, which claims priority to U.S. Ser. No. 62/045,805, titled LEARNING NETWORK SYSTEM, filed on Sep. 4, 2014, the disclosure of which is hereby incorporated by reference in its entirety.

BACKGROUND

Educational institutions may use a variety of information systems for a variety of educational purposes. Large information systems that are used for educational purposes serve many users of varying roles (students, staff, parents). The systems' purpose is either to collect information (e.g., user information) or deliver information (e.g., instructional content) depending on the type of system. These systems are generally termed one of the following types: Student Information System (SIS), Learning Management System (LMS), Content Management System (CMS), Curriculum/Instructional Management System (IMS), and Assessment Analytics System (no recognized acronym).

Additionally, smaller information systems may be included as modules in the larger systems noted above but may also be sold in standalone versions; these most commonly include applications for grading, student health, admissions application management, development (fundraising) tracking, facilities management, and teacher evaluation.

Additionally, educational institutions may use other large systems that often integrate with the previously mentioned system but are not usually part of those systems such as point-of-sale (POS) systems for lunches and library book-tracking software.

SUMMARY

In general terms, this disclosure is directed to a learning network system. In one possible configuration and by non-limiting example, the learning network system includes at least a class scheduler that schedules classes based on requests from students or at least a collection of pages that display information about various school entities (e.g., users, schools, classes, departments, activities, and groups) or at least a searchable directory of curricular resources (e.g., units, lessons, assessments) or at least an analytics engine which evaluates relationships between activities users have engaged in and proficiency on skills/standards needed to perform the activities successfully. Various aspects are described in this disclosure, which include, but are not limited to, the following aspects.

One aspect is a method of generating a class schedule for an educational institution comprising: receiving a plurality of course requests, the course request being associated with a student and including a course subject; generating a plurality of potential class schedules, the class schedules including at least one section, wherein the at least one section identifies a teacher, a course subject, and a timeslot; evaluating the plurality of potential class schedules to generate plurality of scores, wherein evaluating a class schedule from the plurality of potential class schedules comprises: allocating students to each section of the at least one section based on the plurality of course requests; and calculating a score for the class schedule based in part on the number of students allocated to requested courses; and selecting a class schedule from the plurality of potential class schedules based in part on the plurality of scores.

Another aspect is a system for use in an educational organization, the system comprising: at least one processing device; and at least one computer-readable storage device storing data instructions that, when executed by the at least one processing device, cause the at least one processing device to generate an online educational portal, the online educational portal comprising: an academic calendar engine configured to generate and store academic calendars, the academic calendars including years, terms, days, bell schedules, and periods; a class scheduler engine configured to generate class schedules for the academic calendars and to enroll students in classes; and a gradebook engine configured to store grades for students.

Yet another aspect is a method of generating a class schedule for an educational institution comprising: receiving a plurality of course requests, the course request being associated with a student and a course; determining a scheduling order for a plurality of offered courses, the scheduling order being based on expected numbers of sections of the courses; selecting a course based on the scheduling order; generating at least one section for the selected course based on the plurality of course requests, the at least one section identifying a teacher and a timeslot, wherein the timeslot for the at least one section is determined based on availability of requesting students; and enrolling students in the at least one section according to the plurality of course requests. Still another aspect is a system for use in an educational organization, the system comprising: at least one processing device; and at least one computer-readable storage device storing data instructions that, when executed by the at least one processing device, cause the at least one processing device to generate an online educational portal, the online educational portal comprising: an academic calendar engine configured to generate and store academic calendars, the academic calendars including years, terms, days, bell schedules, and periods; a class scheduler engine configured to generate class schedules for the academic calendars and to enroll students in classes based on a plurality of course requests, the course requests being associated with a student and a class; and a gradebook engine configured to store grades for students.

Yet another aspect is a system for use in an educational organization, the system comprising: at least one processing device; and at least one computer-readable storage device storing data instructions that, when executed by the at least one processing device, cause the at least one processing device to generate an online educational portal, the online educational portal comprising: a student information system; and a class scheduler engine configured to: receive a plurality of course requests, the course request being associated with a student and a course; determine a scheduling order for a plurality of offered courses, the scheduling order being based on expected numbers of sections of the courses; and sequentially, based on the scheduling order: generate sections for the offered courses based on the plurality of course requests, wherein the sections are associated with a teacher, and a timeslot; enroll students in the at least one section according to the plurality of course requests; evaluate the generated sections for scheduling conflict for a student; and swap the student into a different section of a previously scheduled course to alleviate the scheduling conflict.

Another aspect is a system for use in an educational organization, the system comprising: at least one processing device; and at least one computer-readable storage device storing data instructions that, when executed by the at least one processing device, cause the at least one processing device to generate an online educational portal, the online educational portal comprising: a student information system; a class scheduler engine configured to generate class schedules; and at least one of: a presentation module that operates to display information about various school entities; searchable directory of curricular resources; and an analytics engine that evaluates relationships between activities users have engaged in and assessed skills of those users in various other activities. Examples of school entities include users, schools, classes, departments, activities, and groups.

BRIEF DESCRIPTION OF THE DRAWINGS

FIG. 10 illustrates an example teacher information screen of an example user interface generated by some embodiments of the interface engine of FIG. 3.

FIG. 11 illustrates an example student information screen of an example user interface generated by some embodiments of the interface engine of FIG. 3.

DETAILED DESCRIPTION

Figure 1:
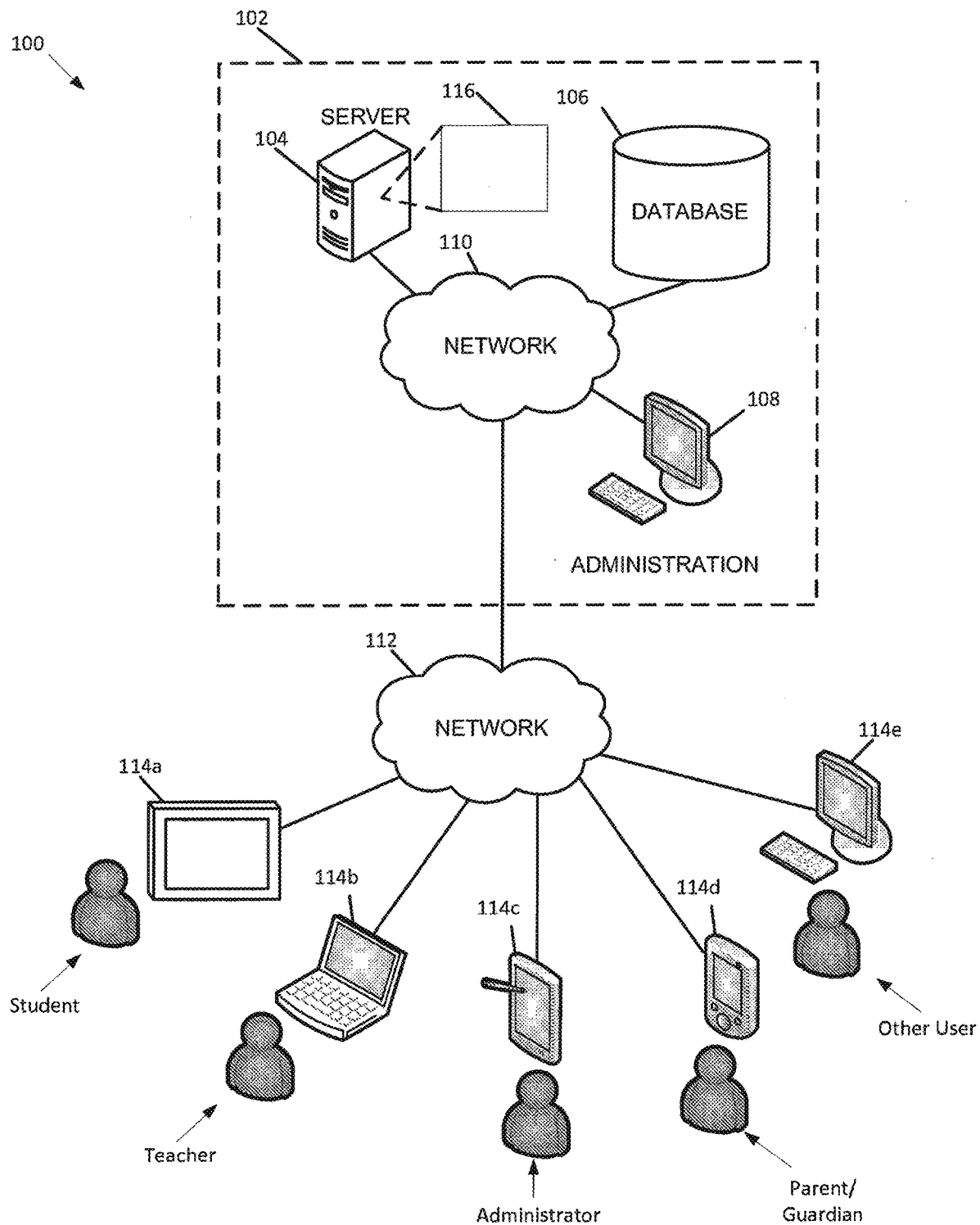
FIG. 1 is schematic drawing of an exemplary learning network system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an exemplary embodiment of a learning network system 100. Students, teachers, administrators, parents/guardians, and others users interact with the learning network system 100 to facilitate learning and management of a learning environment (e.g., a school or group of schools such as a district). The system 100 includes a platform 102 for facilitating learning and managing educational environments, a network 112, and user computing devices 114a and 114e (collectively, user computing devices 114).

At least some embodiments of the platform 102 include a server 104, a database 106, and an administration computing device 108 that communicate across a network 110. The platform 102 operates to generate a learning network that can be accessed by the user computing device 114 through the network 112. The platform 102 can be located at the same location (such as in the same room, building, or facility) as one or more of the user computing devices 114. Alternatively, the platform 102 is located remote from the user computing devices 114, such as in a different building, city, state, country, or continent.

In at least some embodiments, the server 104 includes a learning network engine 116 that controls access to data stored in the platform 102 and generates interfaces to access, add, and modify data. The server 104 is a computing device that includes a database software application, such as the SQL SERVER® database software distributed by Microsoft Corporation of Redmond, Wash. The server 104 can be a Web server or a file server. When a request for data is received by the server 104, the server 104 retrieves the data from the database 106 and transmits it across the network 112 to the one of the user computing devices 114 that requested it. In at least some embodiments, the server 104 also stores information about requests for digital resources and engagement with digital resources in the database 106. In some embodiments, the server 104 comprises a plurality of computing devices that are located in one or more physical locations. For example, the server 104 can be a single server or a bank of servers.

The database 106 is a data storage device configured to store data associated with learning and managing an educational environments. Examples of the database 106 include optical or solid state storage devices, one or more hard disk drives, digital memory (such as random access memory), a redundant array of independent disks (RAID), or other data storage devices. The digital resources and information related to those digital resources can be distributed across multiple local or remote data storage devices. The database 106 stores data in an organized manner, such as in a hierarchical or relational database structure, or in lists and other data structures such as tables. The database 106 can be located on the server 104 or on another computing device. The database 106 can be stored on a single data storage device or distributed across two or more data storage devices that are located in one or more physical locations.

The administration computing device 108 is a computing device configured for administration of the platform 102. The administration computing device 108 can be configured to create users and educational institutions in the database 106. At least some embodiments, do not include an administration computing device 108. Instead, for example, the server 104 may generate various administration user interfaces that can be accessed from the user computing device 114.

The network 110 communicates digital data between the server 104, the database 106, and the administration computing device 108. The network 110 can be a local area network or a wide area network, such as the Internet. The server 104, the database 106, and the administration computing device 108 can be in the same or remote locations.

Similarly, the network 112 communicates digital data between one or more computing devices, such as between the platform 102 and the user computing devices 114. The network 112 can be a local area network or a wide area network, such as the Internet. In at least some embodiments, the network 110 and the network 112 are the same (i.e., a single) network.

In at least some embodiments, one or both of the network 110 and the network 112 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or radio frequency signals and an optical or RF receiver for receiving optical or radio frequency signals. Examples of wireless communication systems include Wi-Fi communication devices (such as utilizing wireless routers or wireless access points), cellular communication devices (such as utilizing one or more cellular base stations), and other wireless communication devices.

Although the platform 102 is illustrated as being separated from the user computing devices 114 by the network 110, part or all of the platform 102 can be stored on and operate from a local data storage device of one of the user computing devices 114 in at least some embodiments.

In the example of FIG. 1, the user computing device 114a is a computing device used by a student to access the platform 102, the user computing device 114b is a computing device used by a teacher to access the platform 102, the user computing device 114c is a computing device used by an administrator (e.g., a principal, guidance counselor, superintendent, etc.) to access the platform 102, the user computing device 114d is a computing device used by a parent or guardian to access the platform 102, and the user computing device 114e is a computing device used by other users to access the platform 102. There can be multiple students, teachers, administrators, parents/guardians, and other users using multiple user computing devices to access the platform. FIG. 1 is simply an example—other embodiments may include more, fewer, or different users.

In at least some embodiments, the user computing devices 114 are desktop computer computing devices. Alternatively, the user computing devices 114 can be laptop computers, tablet computers (e.g., an IPAD® device available from Apple, Inc. of Cupertino, Calif., or other tablet computers running an operating system like a WINDOWS® operating system from Microsoft Corporation of Redmond, Wash., or an ANDROID® operating system from Google Inc. of Mountain View, Calif.), smartphones, e-book readers, or other stationary or mobile computing devices configured to process digital instructions. In at least some embodiments, the user computing devices 114 include a touch sensitive display for receiving input from a user either by touching with a finger or using a stylus. More or fewer of the user computing devices 114 are included in at least some other embodiments and are located in one or more facilities, buildings, or geographic locations.

Figure 2:
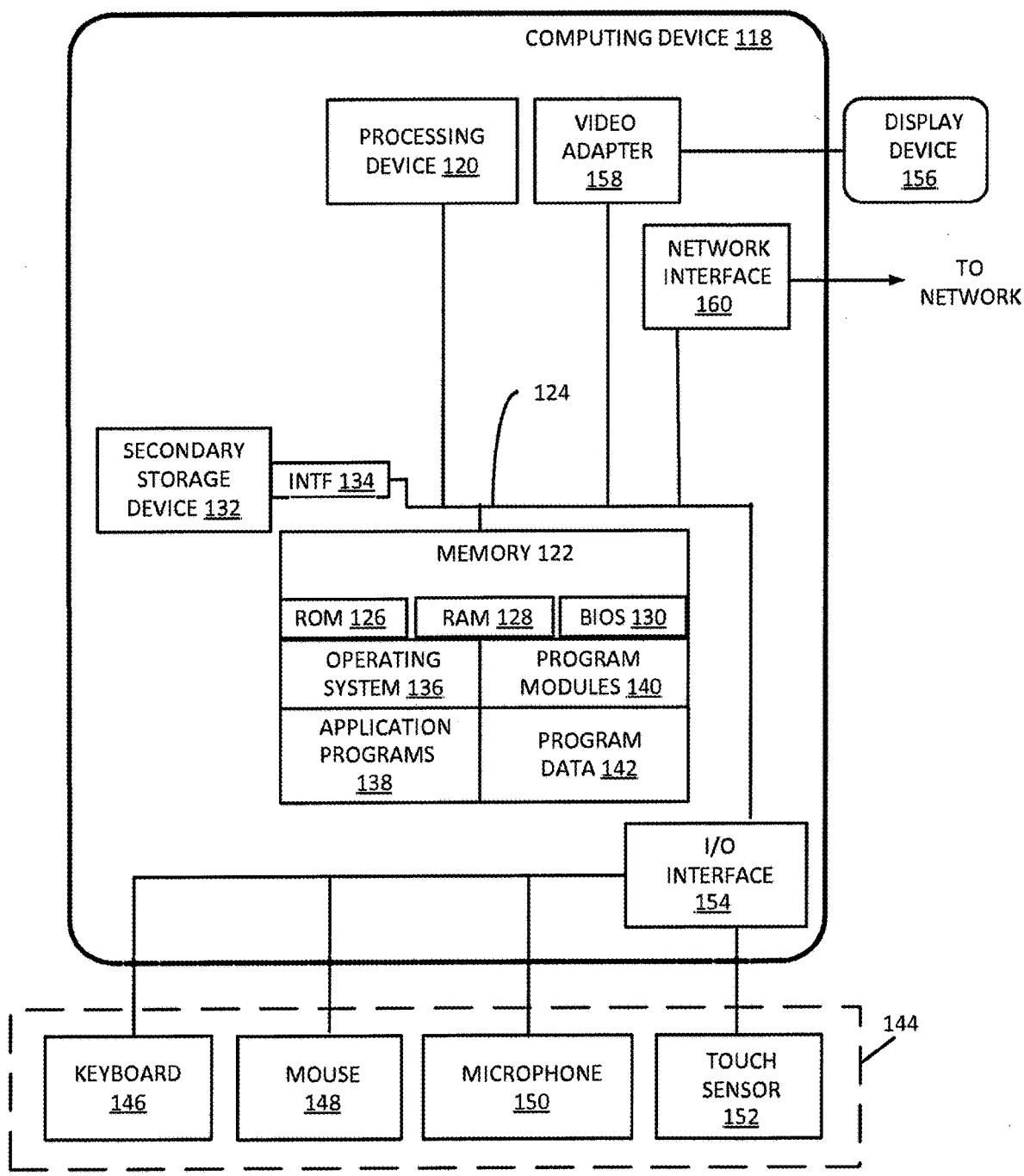
FIG. 2 is a block diagram illustrating example physical components of a computing device configured to run the learning network engine of FIG. 1.

FIG. 2 illustrates an exemplary architecture of a computing device 118 that can be used to implement aspects of the present disclosure, including the server 104, the administration computing device 108, or the user computing devices 114. One or more computing devices, such as the type illustrated in FIG. 2, are used to execute the operating system, application programs, and software modules (including software engines) described herein.

The computing device 118 includes at least one processing device 120, such as a central processing unit (CPU). A variety of processing devices are available from a variety of manufacturers, for example, Intel Corporation of Santa Clara, Calif. or Advanced Micro Devices, Inc. of Sunnyvale, Calif. In this example, the computing device 118 also includes a system memory 122, and a system bus 124 that couples various system components including the system memory 122 to the processing device 120. The system bus 124 is one of any number of types of bus structures including a memory bus or memory controller, a peripheral bus, and a local bus using any of a variety of bus architectures.

Examples of computing devices suitable for the computing device 118 include a desktop computer, a laptop computer, a tablet computer, a mobile phone device such as a smart phone, or other devices configured to process digital instructions.

The system memory 122 includes read only memory 126 and random access memory 128. A basic input/output system 130 containing the basic routines that act to transfer information within the computing device 118, such as during start up, is typically stored in the read only memory 126.

The computing device 118 also includes a secondary storage device 132 in at least some embodiments, such as solid state memory technology, for storing digital data. The secondary storage device 132 is connected to the system bus 124 by a secondary storage interface 134. The secondary storage devices and their associated computer-readable media provide nonvolatile storage of computer-readable instructions (including application programs and program modules), data structures, and other data for the computing device 118.

Although the exemplary environment described herein employs solid state memory technology as a secondary storage device, other types of computer-readable storage media are used in other embodiments. Examples of these other types of computer-readable storage media include hard disks, magnetic cassettes, flash memory or other solid state memory technology, digital video disks, Bernoulli cartridges, compact disc read only memories, digital versatile disk read only memories, random access memories, or read only memories. Some embodiments include non-transitory media.

A number of program modules can be stored in the secondary storage device 132 or the memory 122, including an operating system 136, one or more application programs 138, other program modules 140, and program data 142. The database 106 may be stored at any location in the memory 122, such as the program data 142, or at the secondary storage device 132.

In some embodiments, computing device 118 includes input devices 144 to enable users to provide inputs to the computing device 118. Examples of input devices 144 include a keyboard 146, pointer input device 148, microphone 150, and touch sensor 152. A touch-sensitive display device is an example of a touch sensor. Other embodiments include other input devices 144. The input devices are often connected to the processing device 120 through an input/output interface 154 that is coupled to the system bus 124. These input devices 144 can be connected by any number of input/output interfaces, such as a parallel port, serial port, game port, or a universal serial bus. Wireless communication between input devices 144 and interface 154 is possible as well, and includes infrared, BLUETOOTH® wireless technology, 802.11a/b/g/n/ac, cellular or other radio frequency communication systems in at least some possible embodiments.

In this example embodiment, a touch sensitive display device 156 is also connected to the system bus 124 via an interface, such as a video adapter 158. In some embodiments, the display device 156 is a touch sensitive display device. A touch sensitive display device includes sensors for receiving input from a user when the user touches the display or, in some embodiments, just gets close to touching the display. Such sensors can be capacitive sensors, pressure sensors, optical sensors, or other touch sensors. The sensors not only detect contact with the display, but also the location of the contact and movement of the contact over time. For example, a user can move a finger or stylus across the screen or near the screen to provide written inputs. The written inputs are evaluated and, in some embodiments, converted into text inputs.

In addition to the display device 156, the computing device 118 can include various other peripheral devices (not shown), such as speakers or a printer.

When used in a local area networking environment or a wide area networking environment (such as the Internet), the computing device 118 is typically connected to the network through a network interface, such as a wireless network interface 160. Other possible embodiments use other communication devices. For example, some embodiments of the computing device 118 include an Ethernet network interface, or a modem for communicating across the network.

The computing device 118 typically includes at least some form of computer-readable media. Computer-readable media includes any available media that can be accessed by the computing device 118. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory or other memory technology, compact disc read only memory, digital versatile discs or other optical storage, magnetic cassettes, magnetic tape, magnetic disk storage or other magnetic storage devices, or any other medium that can be used to store the desired information and that can be accessed by the computing device 118.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

Figure 3:
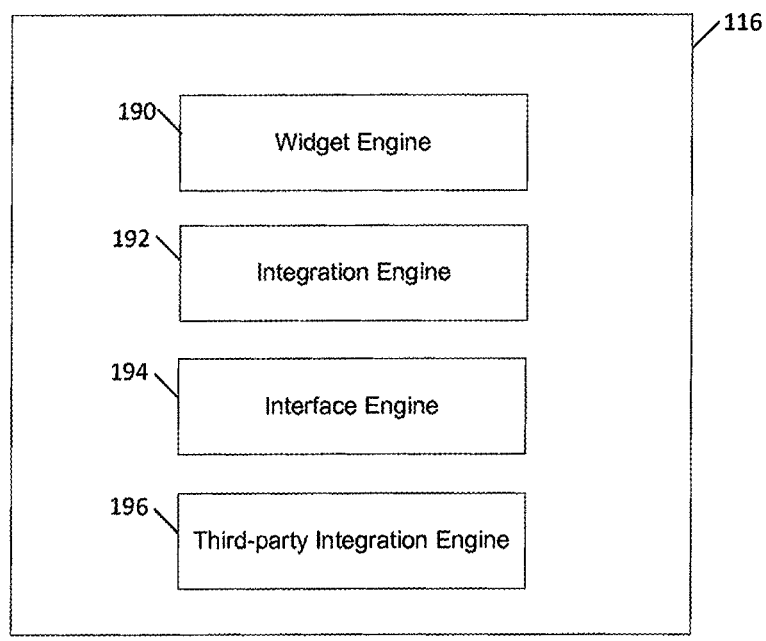
FIG. 3 is a schematic block diagram of an example of the learning network engine of FIG. 1.

FIG. 3 is a schematic block diagram of an example of the learning network engine 116. In this example, the learning network engine 116 includes a widget engine 190, an integration engine 192, an interface engine 194, and a third-party integration engine 196.

The widget engine 190 operates to generate and maintain a plurality of widgets that provide various interfaces and functionality of the platform 102. The integration engine 192 operates to integrates widgets from the widget engine 190. The interface engine 194 operates to generate user interfaces (such as Web interfaces) to access the widgets from the widget engine 190. The third-party integration engine 196 operates to integrate with third-party services such as file systems (e.g., cloud storage systems such as Google Drive from Google Inc. of Mountain View, Calif., Dropbox from Dropbox, Inc. of San Francisco, Calif., etc.), calendaring systems (e.g., web-based calendaring systems such as Google Calendar from Google Inc. of Mountain View, Calif., etc.), messaging systems (e.g., web-based e-mail systems such as GMAIL® from Google Inc. of Mountain View, Calif., etc.), third-party educational applications and platforms, and other third-party applications.

Figure 4:
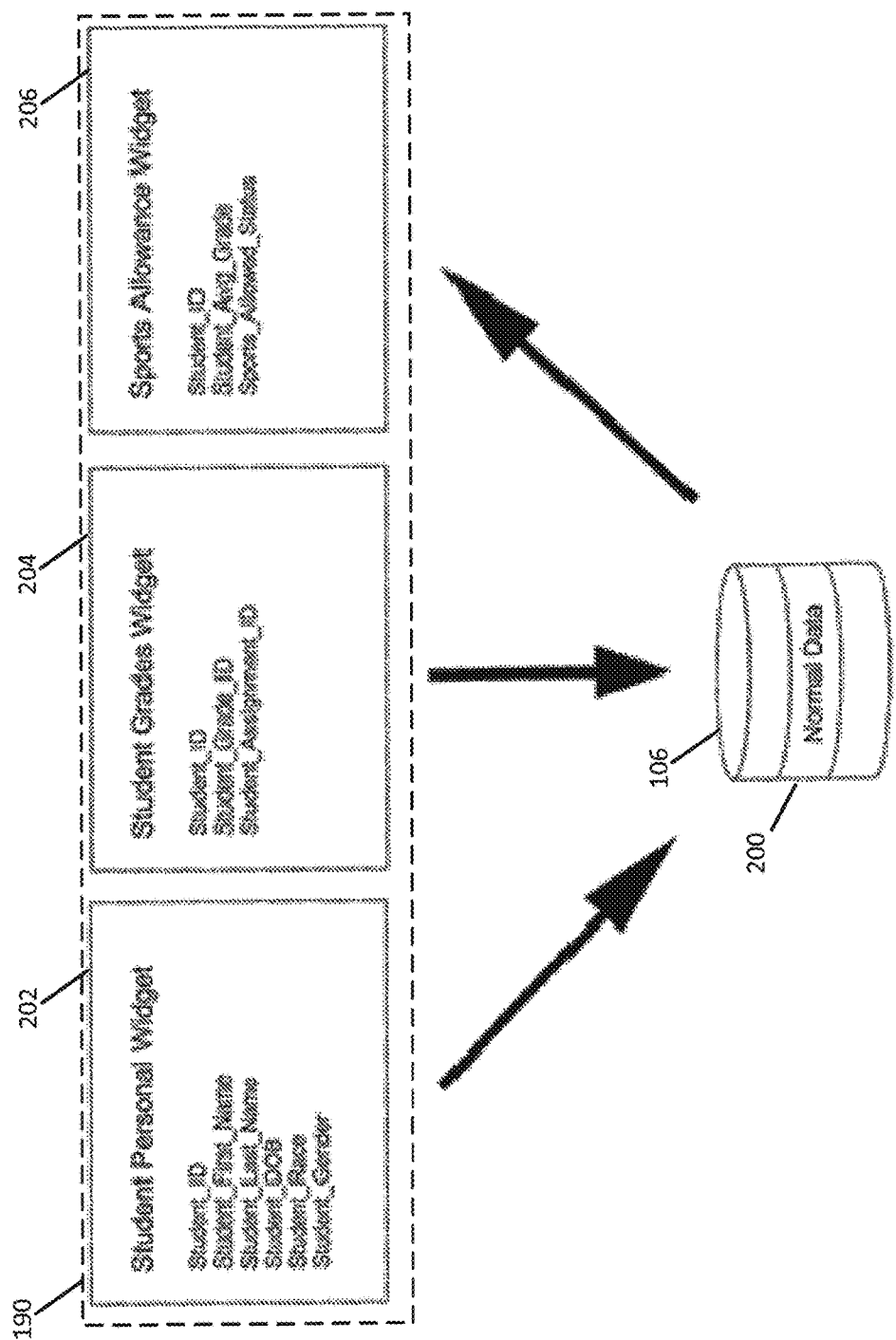
FIG. 4 is an example of the widget engine of FIG. 3.

FIG. 4 illustrates an exemplary widget engine 190 and the database 106 of some embodiments of the platform 102. In this example, the database 106 includes normal (or normalized) data 200. The widget engine 190 includes a student personal widget 202, a student grades widget 204, and a sports allowance widget 206. These widgets are described in greater detail herein and are shown in this figure for illustrative purposes.

The widget engine 190 operates to generate and maintain a plurality of widgets that provide various interfaces and functionality of the platform 102. The widget engine 190 may allow for modularity of major school software components. The widget engine 190 is configured to allow independent manipulation of school information such as personal user data, facilities data, classroom and teacher data, human resources data, schedule data, and accounts receivable data. The widget engine 190 is configured to encompass a plurality of software modules (or widgets) used in large school districts in a common system. While the widget engine 190 is modular with respect to the graphical user interface, each widget connects to a single master database schema, such as the normal data 200, configured to normalize all system data into a single, standard and basic format.

Figure 5:
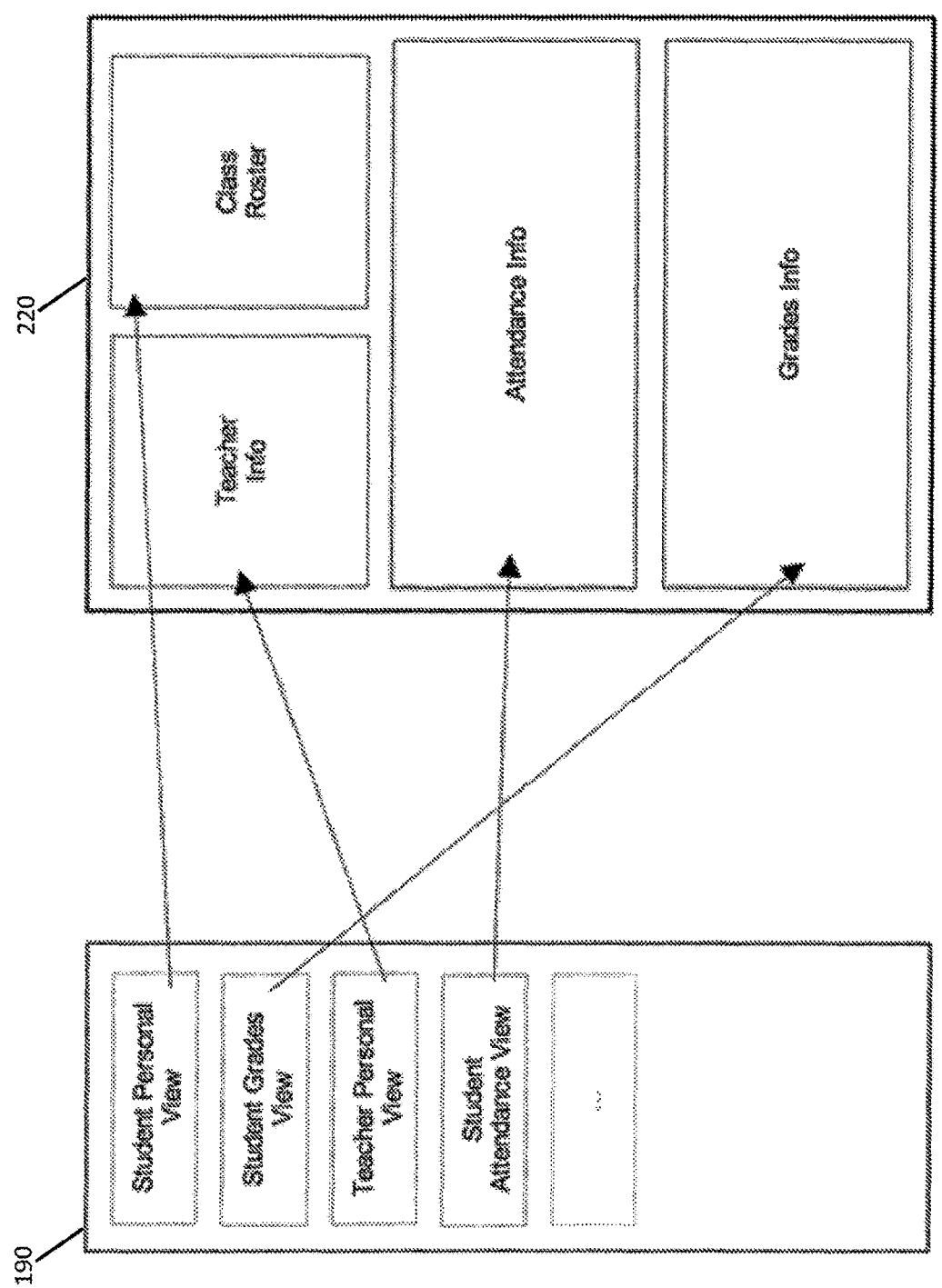
FIG. 5 is an example user interface that includes various components generated by widgets of the widget engine of FIG. 3.

Each widget of the widget engine 190 may include a dedicated view function that allows the widget to be added to a graphical user interface independent of any other widget. Beneficially, the dedicated view functions allow the widgets to be shown (added or displayed) anywhere within the platform 102 or most other Web systems without additional interfacing view code. These dedicated view functions may allow the widgets to be added to third party system even without configuration access or time for development. An example is shown in FIG. 5, in which a user interface 220 is shown that includes various components generated by widgets of the widget engine 190.

The widget engine 190 may provide a common library of oft-used functions; this, combined with conditional checks within the standard library methods and the ability to extend the prototypical properties and methods of any given function, allows the platform 102 to render complex user interface components as required by each widget.

Figure 6:
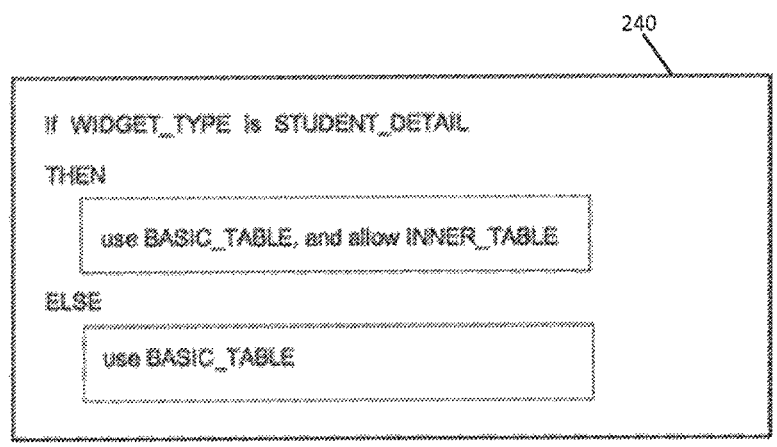
FIG. 6 is an example widget-specific conditional statement that can be used with the widgets of the widget engine of FIG. 3.

Each widget-specific conditional statement within a standard library method operates to yield precise output for the given widgets that uses it, in addition to the prototypical output of that function, which may precede and follow it. An example is shown in FIG. 6, in which a widget-specific conditional statement 240 is shown. In this example, the widget-specific conditional statement 240 operates to use a BASIC_TABLE allow an INNER_TABLE when the widget using the standard library method is a STUDENT_DETAIL type widget. Otherwise, the widget-specific conditional statement 240 uses the BASIC_TABLE. This is just one example widget-specific conditional statement. Other embodiments are possible.

Returning now to FIG. 4, the normal (or normalized) data 200 operates to store data in a common organizational structure and allow any widget to access data directly through the database 106, irrespective of which widget or widgets may have originally inserted that data. The normal data 200 may include multiple tables in a relational database. Other embodiments are possible as well. Beneficially, because most or all of the widgets of the widget engine 190 can access the normal data 200 and because the platform 102 includes many widgets, it may be unnecessary for users (such as school districts) to spend resources on cross-application integrations.

The platform 102 provides a comprehensive Web site builder, on top of which an integrated school administrative, user networking, and teaching platform are provided.

Web Site Builder

The Web site builder facilitates custom Web site development by allowing users to build a variety of page types: parent organization (e.g., school districts), child organizations (e.g., schools), user portal pages (administrative user information), user profile pages (public user information), departments, sections (e.g., a "class page"), groups, and ePortfolios. Each of these page types can have independent designs if desired or can mimic a site-wide design. Users may also build independent pages that are not of any specific type.

To start, a page may be completely blank. A user might begin by adjusting the global page settings: width (in pixels) and color (using for example a hexadecimal color code is valid). A user designs pages by creating "containers". Containers are part of a responsive design approach. A user creates and names a container. A container can be styled using many HTML design properties. By making a container "full width," it will always span the full width of the viewer's browser window. A container that is not "full width" can have different inner and outer backgrounds. Backgrounds can be colors or images; images may repeat or not. A user may set a container's opacity and z-index (which controls whether the container is rendered above or below other containers). A user may also set the container's padding and margin independently for each side of the container (top, bottom, left, and right). A user may set the container's border size, style, and color independently for each side of the container. A user may set the border radius independently for each corner of the container. A user may also create a box shadow on a container, controlling the vertical and horizontal position, the blur radius, spread, color, and opacity of the shadow.

As users apply HTML properties to containers, the containers change in real-time on the page the user is on. A user may also move containers by dragging and dropping them into place in the container modal. The modal may be a slightly smaller model of the page, wherein it is easier to adjust elements. As users adjust elements in the modal, the full-page, which the user can still see behind the modal, adjusts in real-time. In at least some embodiments, there is no separate set-up page used to design site pages, only an edit mode, so the user may see the page exactly as site visitors would see it. This may also be true of other page types, like portal and profile pages, but a user designs a template page, which is then used to create all instance pages.

Containers created by the parent organization (e.g., districts) can be shared with child organizations (e.g., schools) and re-used anywhere on the platform 102. Containers created by child organizations are reusable anywhere within the child organization's site pages.

In some embodiments, containers are used only for styling. To begin to structure a page for content, a user creates one or more columns. Columns are used to structure container space. In some embodiments, pages are, by default, set to 12 columns wide, so users can set column widths to any number 1-12 to define how wide a column should be. A user can apply all of the same HTML styling that can be applied to a container to a column. In addition, a user may also set column height and choose whether content in the column that exceeds the specified height should be hidden or shown and if shown, whether by overflowing the column space or scrolling. A user may also rearrange columns by, for example, dragging them to a desired location in the container modal.

When a user is editing the style of a container or column, the area that the user is actively editing may display with a blinking border so it is clear to the user which part of the page is being edited.

After a user has created and designed at least one container and column, but likely more, the next step is to add "widget areas." These widget areas subdivide columns to hold content, which takes the form of one or more "widgets." Beneficially, a user may use widget areas to control sub-paging and permissions. A page designer can set a widget area's permissions to either allow or disallow another user to place widgets in the area. For example, if the user is designing profile pages, the user may disallow other users from changing the page's header and footer to ensure consistency across site pages, but may allow other users to place widgets in the page's body, which presumably will be different for each of the other users based on his or her choices for self-expression. Sub-paging allows a user to designate some areas of the page to change and others to stay the same. For instance, sub-paging may be useful if a user wants the header and footer of all of the pages to stay the same but the body area to change. A user can also set permissions differently by sub-page, so if other users should not be able to change the home page of a certain page type (section, department, etc.) but should be able to add additional pages and make changes to those additional pages, the sub-page permissions can be configured accordingly.

Once the user has created widget areas, the user closes the container modal and begins to work directly on the page by adding and styling widgets. Widgets may, for example, be modular applications; many can be placed on any page, but some are limited to certain page types. When a user presses the "select widget" button in a specific widget area, the user will see a selection of widgets from which to choose; these widgets generally pertain to the type of page and to the type of user who is expected to use the page (student, parent, teacher, etc.).

On any page, a user can choose to add an HTML, slideshow, container loader, or navigation widget; these widgets have wide applicability. In some embodiments, the widgets can also be styled in the same way that containers and columns can be styled, in real-time. Users can also set a widget's width, creating columns within widget areas. Finally, a user can also choose "independent positioning" for a widget, which frees that widget from staying in its container. Instead, the user can drag the widget to any location on the page with 1×1 pixel specificity.

The HTML widget can contain any HTML code: text, documents, images, tables, symbols, videos, and so on. Users can edit HTML widget content in-line in real-time.

The user can type text and use styling tools on a toolbar to choose the color, font, alignment, and so forth. To insert an image, a user will upload the image to an upload manager using an uploader tool, and that image will be available throughout the site. The user can also upload documents to the upload manager or choose to incorporate assets available in a third-party service like Google Drive; the user can then provide links to these assets. In some embodiments, the user may edit the HTML code of the widget directly as well (e.g., if the user finds the in-line editing toolbar limiting).

The slideshow widget allows the user to upload a collection of images and, optionally, to add captions. This widget will cycle through the user's pictures, using various transitional effects.

The container loader widget allows a user to load a pre-created container into a widget. Beneficially, the container loader widget may allow a user to reuse some content when a sub-pages is not appropriate because not all pages will be the same or the reused content will appear in a different location on each sub-page.

The navigation widget may be used to add additional pages to the current page type and to manage the site's page structure/hierarchy. First, the user has additional special styling options for navigation elements. The user can choose whether a navigation bar should be horizontal or vertical. The user can also set the style (font, size, color, border, etc.) of the navigation bar's background, links, and child links, as well as set different styles for these elements when a user hovers over them. Because there are so many style settings that define a navigation element, those collections of settings are saved as a "Style," which can then be copied with a single click to a new navigation element so the user need not keep re-creating the same style but can still maintain a consistent look and feel for navigation elements throughout the site.

Once the user has styled the navigation widget, the user can add links to it. When a user creates a link on a navigation widget, the user has created a new page. Clicking on the link in the navigation bar will take the user to the new page in order to design it. The user has a choice of creating a new page or only a new sub-page; a sub-page will retain the design of the parent page. The user can also create a text-only navigation item, which does not create a new page, but this link can still have children. For instance, a teacher can use text-only navigation items to create a heading called "Units" that does not link to a new page but has child links that do link to new pages for each unit taught. Finally, the user can create a category link, which pulls a collection of items from the administrative area of the site (such as schools or departments) and creates child elements for each of these items that links to the item's respective page. The user can arrange the order of the navigation elements and whether or not one element is a child of another by dragging and dropping the elements into place in the navigation menu editor. By dragging one element over another and holding it in place for a second, the item being held will become subordinate to the element it is held on top of (i.e., the dragged item becomes a child element). Finally, a user can also upload an icon to appear next to each navigation element if desired. In some embodiments, icon images are automatically re-sized and transparency of the icon images is maintained (e.g., with .png format images). Other embodiments of the navigation widget are possible as well.

School Administrative Framework, User Networking, and Teaching Platform

Schools need to track a great deal of information and may use one or more of the following independent systems: Student Information Systems (SIS), Learning Management Systems (LMS), Assessment Analytics Systems, or other systems. In some embodiments, the platform 102 encompasses the features found in all of these systems in a very tightly integrated fashion. In some embodiments, the platform 102 operates to support hierarchical organizations such as districts and schools within a district (other hierarchical organizations may be supported as well). Administration of the platform 102 from a child (e.g., a school) may be performed through a separate account than the parent (e.g., a district). Child accounts may not have as many capabilities as the parent account. Instead, the child account may use a variety of settings provided by the parent organization. In many of the examples herein, hierarchical organizations are described in terms of schools and districts. However, other embodiments are possible with other types of hierarchical organizations as well.

Calendar

The platform 102 may include calendaring. Calendaring lays a foundation for a number of other modules (or widgets), including attendance and course scheduling. Schools often have complex calendaring systems to provide both flexibility and regularity. In order to provide regularity, the platform 102 may provide a calendar with a repeating cycle with the following parts: years, terms, days, bell schedules, and periods. In addition, schools can also set holidays.

In some embodiments, the parent organizations define years and terms. Years may have a start date, end date, and abbreviation. Years may reflect calendar years or school fiscal/academic years (e.g., July-June). If different child organizations (e.g., schools) within a parent organization have different start and end dates, the parent organization can create multiple years. A school then selects only the year or years that apply to it. The same structure applies to terms; terms belong to years, and terms also have a start date, end date, and abbreviation. While years and terms are defined by the parent organization and selected by the child organization, days, bell schedules, and periods are defined by the child organizations.

A "day" is a type of record that refers to an actual day and helps schools define course meeting patterns. For instance, some courses meet every day while other courses meet every other day or any other pattern of a school's choosing. For example, academic classes may meet more frequently than elective classes. Days are generally lettered, for instance, A-day and B-day. An academic class will may meet every day (e.g., on both A- and B-days) while an elective class might meet on only one day or the other. Schools (child organizations) may define how many days occur in their calendar cycles and name them.

A "bell schedule" defines the timing of different periods in the day. A school (child organization) may use one bell schedule for most days and other bell schedules occasionally. So, for example, a "regular" or "common" bell schedule might consist of seven or eight 50-minute periods that occur between 8:00 a.m. and 3:00 p.m. In contrast, an "early release" bell schedule might consist of seven or eight shortened, or 40-minute periods, between 8:00 a.m. and 2:00 p.m. The school might also utilize an "inclement weather" bell schedule, in which times are shifted to accommodate a later start to the school day. Schools can define and name as many bell schedules as they wish.

A "period" is a length of time during which a course section meets. In many schools (child organizations), periods are between 40-60 minutes in length. Some periods do not meet every day. For instance, a "homeroom" period may only meet once a week. Schools name and define their periods; then, they add periods to each bell schedule they've created. When a school defines a period, the school simply names the period. When the school adds the period to a particular bell schedule, it then defines the start and end times of that period in that bell schedule. A period is an example of a timeslot for scheduling courses.

Using a combination of days, bell schedules, and periods, the platform 102 allows a school to create any course-meeting pattern it desires. Every calendar date is assigned a day and a bell schedule. This dictates which periods will meet that day and at what times they will meet. The days and bell schedules may follow a repeating cycle, such as ABAB. Alternatively, to achieve an every-other-day-with-alternating-Fridays, a school might use a ten-step sequence: ABABA-ABABB. The day and bell schedule for every date in a calendar year may be set manually. Alternatively, some embodiments of the platform 102 include an "auto calendar" function that allows the user to define the pattern of days and bell schedules and in-session versus not-in-session days and apply them automatically (such as by using an automatic script). The user may view the results of the auto calendar function for each date of the year and manually make changes if desired. The school (child organization) can also define custom reasons school may not be in session (e.g., weekend, vacation, staff development, etc.) and indicate this for a particular date.

Finally, a user can also set holidays. A user may set holidays at either the parent or child organization level. Holidays set by the parent organization can be mandatorily applied to some or all child organizations. When a holiday is defined, a user can indicate whether school is in-session or not-in-session on this holiday, and the calendar settings will reflect this choice.

In some embodiments, the calendar module integrates with third-party calendaring application/services such as a calendar provided with a Google account. Some or all of the entities (e.g., district, school, department, room/resource, course section, activity, group, user) in the platform 102 may have a Google (or other third-party) account associated with the platform. In some embodiments, the platform 102 syncs calendaring with the third-party to create district and school calendars within the third-party application/service, which can be edited through the platform 102 without having to visit the third-party interface. Users can also create events through the platform 102 that include an automatic link to a third-party map (e.g., a Google map), and choose to which third-party calendars the event is posted.

In some embodiments, the integration with the third-party is two-way, meaning that events that users create on the platform 102 are posted to third-party, and events that users create while logged into the third-party account are posted back to the platform 102 as well. A user can view his/her calendar, with all subscriptions, in the platform 102. Also, any entity's calendar, such as a district, school, department, or activity, can be posted to any site page, thus showing all the events that belong to that entity, regardless of the viewing-user's calendar subscriptions. When viewing a calendar widget on a site page, a user can choose which calendar(s) to display, thus easily filtering to the desired events. In some cases, the platform 102 maintains additional information for events than are maintained by the third-party calendaring application (e.g., Google calendar). For instance, for athletic events, the platform 102 may collect additional information such as the opposing team, dismissal, departure, and pick-up time, uniform colors, mode of transportation, and officials. This additional information can be viewed by clicking an event in a calendar widget of the platform 102, which displays a modal with the additional information.

The platform 102 may also sync with third-party resource calendars (e.g., Google resource calendars) for rooms and other resources so that users can reserve these resources from the platform 102. In some embodiments, the resources are scheduled using one or more of an interface provided by the platform 102 and an interface provided by the third-party resource calendar. For instance, a user may schedule a department meeting, and by including the desired room in the event invitation, that room's calendar will show that the room is occupied during the relevant timeframe. In some embodiments, invitations are handled through the process defined by the third-party resource calendar (e.g., room/resource reservations will be either automatically accepted or sent to a specific person for approval).

Directories

The widget engine 190 may include a directory widget that allows searching for users who are students, staff, and parents. The directory widget contains a set of filters: school membership, status, group membership, grade level, position, gender, and the initial letter of the first or last name. Additional filters based on additional criteria may be added as needed. A filter allows a searcher to select one or more option. After a selection is made, the interface may update to show the users matching the selected filters. Results may be paginated (e.g., by showing 10, 25, 50, 100, etc. results per page). From the results list, a searcher can click different icons to access the desired user's portal or profile page, or, if the user has administrative access, edit user information.

Courses/Class Page Widgets

In some embodiments, the platform 102 may also provide course/class page widgets and some or all of the related widgets described herein. Organizations may add courses to a master course catalog. The master course catalog may include a record of all courses the organization offers (or, in some embodiments, has ever offered, as records may be maintained for historical purposes). A master course record may contain high-level information about a course such as the organization's course number, name, department, catalog description, term length, credit hours, curricular designations, maximum enrollment, and a variety of grading settings (grading modes and scales to use, to what purposes grades count, etc.). Master course records are maintained by the parent organization.

In some embodiments, master course records are not used directly to create the sections of courses that underlie teacher assignments and student enrollments. Rather, in order to create a section of a course, a child organization (school) must first create an instance course record by importing a copy of the master course record to a specific school catalog for use in a particular academic year. Schools can curate their own catalogs, which are simply labels for collections of courses that are helpful from an organizational standpoint. When a school imports a master course record into a particular catalog, the parent organization's settings are copied; the school is then allowed to change some of these settings. In addition, the school can create settings that will apply to the automatic course scheduler (described below); these include possible meeting times (terms, days, periods), possible teachers, possible rooms, and meeting pattern.

Once the school course instance exists, course sections can be created and filled with students by the automatic course scheduler. However, an administrator can also manually create sections and enroll students. To manually create a section, a user clicks a button to add a section and then defines at least some of: the exact meeting time (term(s), day(s), and period(s)), grading periods, credit hours, term length, teachers, resources, rooms, and grading settings. In manually creating a section, a user is defining a specific meeting pattern, teacher(s), and room(s), as opposed to listing all possible combinations and allowing the automatic scheduler to select specific options. Once a section has been created, an administrator may then enroll students in the section by selecting the section and the student(s) to enroll.

In some embodiments, the platform 102 creates a section page when a user creates a section. A section page is a type of site page, but may include a variety of widgets that are likely to be of use on a section page. These widgets may include: course description, section information, roster, announcements, expectations, handouts, project groups, calendar, section units, assignments, class attendance, grade book settings, grade book, grade book colors (conditional formatting), narrative comments, and student performance.

The course description displays the text catalog description as it is entered in the school's administrative area. The section information widget displays the course name, section number, timetable, room(s), teacher(s), and enrollment figures. The roster lists the particular students enrolled, showing each student's picture and grade level, and links to the student's portal and profile pages. The announcements widget is a place for the section teacher to post announcements for visitors to the page; announcements are dated and can be set to send alerts to users via internal messaging, text (SMS) messaging, or e-mail. The expectations widget allows teachers to list expectations for class participation, such as attending all classes or completing work, etc.

The handouts widget is a place for a teacher to be able to post resources for students to access. In some embodiments, the handouts widget is integrated with a third-party application/service such as Google Drive. The platform 102 manages the folder structure within the third-party application/service for the teacher. For example, for each course a teacher teaches, the platform 102 may create a folder, and within that folder, create folders for each section. Within each section folder, the platform 102 may create an assignments folder (described elsewhere herein) and a handouts folder. Items uploaded to the handouts folder, either from an interface generated by the platform 102 or from a third-party interface, will appear in the handouts widget on the class page. Users can then view or download the file/s.

The "project groups" widget allows a teacher to create groups that correspond to a particular assignment. Groups, in general, exist on the platform 102 and have their own group pages, where users can essentially create a tailored workspace and networking area. As opposed to simply creating general groups, the project groups concept is useful because the teacher can divide the class into workgroups and give them each their own online space to collaborate, linked to the assignment for which the group has been created. In some embodiments, the teacher may access these pages to monitor student work.

In some embodiments, the platform 102 operates to integrate calendaring widgets (described elsewhere herein) with the class pages. When a calendar is placed on a class page, it will, by default, display all class meetings. In addition, as the teacher posts assignments, those assignments and their corresponding due dates will appear on the calendar. In addition, the teacher can post other events to the calendar. Because the calendar may be a third-party calendar (e.g., a Google calendar), users may subscribe to the calendar using an account provided by the third-party (e.g., with a Google account). In some embodiments, students are automatically subscribed to the calendars of sections in which s/he is enrolled.

The "section units" widget is a place where the teacher can post units that the class will study, and so students can see the associated resources. Units are described in more detail herein (e.g., in the curriculum management section).

The assignments widget is where a teacher posts assignments for students; it is integrated with a variety of other widgets. In order to create an assignment, a teacher may provide some or all of the assignment's title, category (e.g., homework, quiz, test, etc.), due date, whether or not it is a graded assignment, whether or not the assignment links to an automated assessment, the description, points possible, whether or not to enable an online drop-box, and whether or not the due date should be enforced. If it is a graded assignment, then the assignment will automatically appear in the grade book (which is described in greater detail herein). If the assignment is an automated assessment, then the link to the assessment, which may be created in the platform 102, will be provided so the student can access it.

In some embodiments, the teacher may enable an online drop box. If the teacher selects the option to enable an online drop box, then the platform 102 may create a folder in the teacher's linked third-party account in order to accept assignments students will submit; again, the platform 102 may manage the folder structure within the third-party account (e.g., by creating a folder within Course>>Section>>Assignments>> Assignment Name in order to organize the submissions). The platform 102 may also rename submissions to include the student's name in the file name so that the teacher can more easily identify desired files when all students are likely to name their files for the same assignment similarly. If the teacher chooses to enforce the due date, then a student will not be able to submit a file or complete an assessment for a grade after the due date has passed. Once the teacher has created an assignment, the teacher may also attach related files: for instance, an instruction sheet that will aid the student in completing the assignment. Files may be linked to assignments if they already exist in the teacher's Drive account in the handouts folder. If the teacher chooses to upload a new file, it will be added to the appropriate handouts folder. Once the teacher has created the assignment, s/he may also copy that assignment to other sections of the course in order to avoid duplicating work; s/he may still set the assignment category, due date, and points possible independently for each section and does not have to visit each section to do so but may do it from the sections modal in any assignment widget where the assignment has been posted. Finally, past-due assignments are hidden from the widget's default view but are shown if a user clicks "show past assignments," in which case they may be display in a visually distinct manner (e.g., shaded pink or another color or otherwise visually identified).

The platform 102 may include section attendance pages. A section attendance page may be its own site page type and access to the section attendance page may be limited to teacher(s) of a section and site administrators. The site attendance page may include the section attendance widget. The section attendance widget works similarly to the general attendance widget (which is described in greater detail herein). However, the section attendance widget only includes students in a particular section. The platform 102 may include a setting for school administrators to indicate whether or not section teachers should take daily or period attendance; if the administrator selects period attendance, then only the periods in which the particular section meets will be available for recording attendance. In a section attendance widget, a teacher may also display a seating chart mode, with the students' names and pictures shown in a layout that reflects where the students are seated in the classroom. Beneficially, this can speed the teacher's process of recording attendance and make it straightforward to take attendance on a mobile device. The platform 102 allows teachers to set up the seating chart by dragging and dropping students' pictures to the desired location on the screen.

Grading/Grade Book

There are a variety of grading settings that are controlled in the administrative area of the platform 102.

First, the district/parent organization may define the grading scales it wishes schools/child organizations to use. A grading scale is a collection of grades that can be given to students. A grading scale may have a name and a description, (e.g., "High School A-F" "Standard 0.0-4.0 scale").

Then, the district/parent organization will define grades (e.g., "A," "A–," "B+," and so on). The grades have a name, description, and default minimum score. Once grades are created, they are added to one or more grading scales. When a grade is added to a grading scale, the platform 102 copies the default minimum; however, the default minimum score for the grade can be independently set for each scale that includes it, as can the number of grade points for a grade (e.g., in an honors class such as an Advanced Placement (AP®) course authorized by the College Board of New York, N.Y., an A can be set to 5.0 grade points as opposed to the usual 4.0). The site administrator can also independently set whether or not a grade will count in GPA calculations, whether or not it counts for graduation credit, and whether or not a teacher can assign the grade. The grade also has a "value." Normally, a teacher gives a student a percent-based grade, and then, the minimum score is used to translate the percent to a letter; however, in some cases, a teacher will simply assign the letter grade, and in this case, the value is used to derive the percent.

After creating grading scales and grades, the administrator may also create grading periods. Grading periods belong to a school year and may consist of a name, abbreviation, start date, end date, fraction of a year, and a setting indicating whether or not it is a "final" grade. Grading periods are used to determine which grades will count towards a report card grade. For instance, if first semester runs from September to December at a particular school, then all assignments in a particular section that fall between the defined start and end dates will count towards the student's grade for this grading period. The fraction of a year is required to determine how to treat this particular grading period in GPA calculations. The "final grade" setting is used to differentiate grading periods that are used for report cards and transcripts from those that are used simply for progress reports.

The school administrator may also define GPA calculation methods, giving each calculation a name and description and then selecting the grade levels and courses to which this calculation will apply. For instance, a "cumulative" calculation will likely include all the courses the student has taken while at the school while a "9th grade" calculation would likely consist only of courses taken when the student was in the 9th grade. The administrator can also define the number of decimal places to use in the GPA and in the credit hours for courses when calculating the GPA.

The platform 102 allows the school administrator to define one or more honor rolls. An honor roll consists of a name and a minimum GPA. An honor roll listing lists all the students whose GPA is at least the defined minimum GPA and whose GPA is not high enough to be in the next highest listing. For instance, a listing for "Regular honors with GPA 3.33" would include students with GPA from 3.33-3.66 while a listing for "High honors with GPA 3.67" would include students with GPA from 3.67-4.00, assuming there is no higher honor roll.

Another grading widget in the administrative grading area is the "class rank" widget. This lists all of the students from highest to lowest GPA in a given grade level. Rank numbers are provided, skipping a number when two students have the same rank. For instance, one might see rank numbers of: 1, 1, 3 if two students are tied for valedictorian.

The school administrator can also create settings for standards-based grading. The district can create its own collections of district-defined standards or choose to use a collection that is already in the site, such as the Common Core State Standards. Once the administrator has either selected or created one or more collections of standards, s/he can assign standards to be used for students in particular grade level(s) in particular terms. For instance, a user will expect to see standards such as "can count to 100" or "can write one's name" as available options for kindergarten students.

The "Grade book" is its own site page type, which only the teacher(s) of a section and site administrators can access. As with any site page, site administrators may structure the page in any way they choose in the page setup area; however, there are some widgets that are more likely to be of use here. These include grade book settings, grade book colors (conditional formatting), grade book, narrative comments, and student performance.

The "grade book settings" widget is where the teacher will define assignment and standard categories for use in the grade book. Assignment categories may be named in any way the teacher chooses, but commonly-used category names include "homework," "quizzes," "tests," and so on. When a teacher creates an assignment category, s/he also chooses a weight for the category and a percentage to dock assignments in this category if late. Standard categories can be chosen from those the school administrator has made available for the grade level and term matching the students and course settings for this particular section. As with other section widgets, a grade book category may be copied to all sections a teacher teaches.

The "grade book colors" widget is used to define conditional formatting rules for use in the grade book. The teacher will name the rule, define a low and high score for the rule's range, and select a color. Then, when conditional formatting is applied in the grade book, scores falling within the defined ranges will be colored as chosen. As with other section widgets, a grade book color may be copied to all sections a teacher teaches.

The grade book widget itself is where the teacher will enter grades for students. It has two modes: assignment-based and standards-based. Either one or both of these modes will be available based on the administrative section settings. If both modes are available for a given section, a teacher can toggle between the modes via a filter. The teacher can also toggle between all grading periods for the section via a filter (e.g., "progress report," "first semester," etc.). Once the mode and grading period has been selected, the teacher will see the items available for grading. In the assignment-based mode, these items will be the assignments the teacher created in the assignments widget for this section whose due dates fall in the selected grading period. Each assignment will be its own column in the grade book, with each student its own row. The assignment column displays the assignment's name, points possible, and category. There is also a one-click button to display a bar chart showing the grade distribution and/or frequency for all students in this section and related statistics, such as the number of scores recorded, the lowest and highest scores, the average (arithmetic mean), median, and standard deviation. Finally, there is a button to drop the entire assignment from calculations for all students.

The teacher will enter grades for students by typing the points earned in the input box provided. As the user types, the percentage, based on points earned divided by points possible, as well as the user's overall grade, is calculated and updated with every keystroke. At the bottom of the column, the average, low, and high for the assignment are also displayed and updated on every keystroke. If the assignment has a drop-box enabled, the assignment can be viewed from the grade book by clicking on an icon that looks like a piece of paper; the assignment will open in Google Drive (or another third-party application/service) in a new tab in the user's browser. If the assignment is based on an automated assessment, that grade is automatically calculated based on the student's answers, and the teacher cannot edit the overall points earned; however, the teacher can click a magnifying glass icon to view the student's answers to the assessment questions and edit the points earned per question, which will alter the overall grade for the assessment. Sometimes, it is necessary that the teacher review and assign points for assessment grades if the questions are free-response, text, image, audio, or other input, in which case the platform 102 does not grade them automatically.

In the grade book, the teacher may also switch to unweighted mode to see how this changes the grades students have earned. The teacher may also turn conditional formatting on or off, and drop scores based on their assignment category. For instance, in some cases, a teacher will drop the lowest quiz score in a class; once the teacher sets this condition, the system will handle this, dropping each student's lowest quiz score, which may well be a different assignment for each student, and automatically updating the calculation. The teacher may also set the date an assignment was submitted, and if the teacher has set up docking, then late assignments will be docked by the amount the teacher has specified for assignments in that category. When scores are docked, the cell background turns pink as an indicator. The teacher may also drop individual assignments on a per-student basis. When scores are dropped, the text turns red as an indicator. The teacher may also edit the grading scale thresholds if the school administrator has allowed this; for instance, if a school defines an A as starting at 93, but a teacher prefers to start the A-range at 95, this is allowed. Finally, the teacher may also override the final calculated grade by clicking on the grade and choosing a different grade from the section's assigned grading scale.

In standards-based grading mode, the columns will be standards as opposed to assignments. The teacher can set the grade earned for each standard by clicking on the input box that holds the grade and selecting the desired grade from the scale. As in the assignment-based grading mode, the average, low, and high for a standard are displayed at the bottom of the column, and the teacher may still override the final calculated grade if desired.

In both modes, the teacher may make a comment on any individual assignment or standard, and these can be made available to students and parents on reports. The teacher need simply click a speech bubble icon next to the grade input box in order to display the comment modal.

The "narrative comments" widget is used to provide more substantial feedback to the student on a report card. The teacher selects the term for which s/he will provide comments and may make both general and student-specific comments. The "general comments" are used to enter anything that the teacher would like to appear on every student's report card; for instance, the teacher might summarize key points that were covered during the term. Then, student-specific comments are appended for each student on his/her report card. These narrative comments may be edited throughout the term since they are only generated on report cards at the term's end.

The "student performance" widget is described in greater detail (e.g., in at least the "assessment analytics" section).

Scheduler

In some embodiments, the platform 102 includes a master-scheduling algorithm to define when each course section will meet, who will teach that section, the room in which the section will meet, and which students will be enrolled. In order to run the master-scheduling algorithm, the administrative settings for courses, defining the possible teachers, rooms, and timeslots must have been completed. In addition, students must have made their course requests for the academic year that is being scheduled.

First, the platform 102 schedules a section, enrolls students who have requested that course, and then schedules another section, and so on, taking into account those resources (teachers, rooms, students) that have already been scheduled when scheduling a new section so as to minimize the number of conflicts. For example, if a student has requested AP Calculus and Orchestra, and there is only one section of each, those sections cannot be scheduled in the same timeslot without causing a conflict. Based on this example constraint, the scheduler may schedule AP Calculus in one period and then schedule Orchestra for a different period. In contrast, existing scheduling software schedules all the sections into a timetable and then attempts to enroll students, resulting in many more conflicts.

Second, the platform 102 employs a user interface with a variety of tools that are useful for hand-scheduling in conjunction with the master-scheduling algorithm in order to facilitate human interaction. In order to interact with the scheduler, it must be able to be stopped periodically, allow a human operator to make adjustments, and then start scheduling again. In some embodiments, the user interface for the scheduling algorithm provides these play/pause capabilities.

Finally, the platform 102 can also master-schedule an entire district, as opposed to just a school, taking into account those teachers who travel between schools during the day.

In some embodiments, the core of the scheduling algorithm is a heuristic search (e.g., a search based on the "A*" (A "Star") algorithm). The search relies on three important functions: "Progress Score," "Remaining Score," and "Fill Section."

P(s): Progress Score: This function takes a partially completed schedule "s" as input and returns a score based on the student requests and teacher full-time equivalents (FTEs) that have been scheduled in the partially completed schedule "s."

R(s): Remaining Score: This function takes a partially completed schedule "s" as input and returns an estimate of how much more score can be achieved by adding to "s," given the student requests and teacher FTEs that have already been scheduled.

F(s, c): Fill Section: This function takes a partially completed schedule "s" and a proposed section "c" to add to "s" and returns score for each student request that could be added to "c." A section is defined as a legal combination of course, teacher, timeslot, and room. In other words, it is a proposed class that can be legally added to schedule "s." This function scores each student request such that the higher the score, the "better" it is to add the request to "c."

Given a partial schedule "s," the total heuristic function H(s)=P(s)+R(s). This is the sum of the progress score and the estimate of the remaining possible score for "s." This function provides an estimate of how "good" the final schedule achieved by starting from "s" will be. The search algorithm then proceeds as follows.

1. Create an empty list "L" that will contain partially completed schedules.
2. Create a single empty schedule and add it to "L".
3. Select the partial schedule "s" from "L" for which the total heuristic function H(s) is the largest. Remove it from L.
4. Enumerate every legal course section "c" that could be added to "s". If there are no legal sections, go to (7). Else continue to (5).
5. For each "c", use F(s, c) to score all student requests that could be added to c. Fill c up to 80% of its room's capacity. Create a new schedule "s2" by adding c to s. Add s2 to the list L.
6. After all new schedules have been added to L, eliminate all but the top "n" schedules from L as defined by the heuristic function H(s). Go to (3).
7. Return "s" as a completed schedule.

Although the steps listed above are numbered, some embodiments of the search algorithm perform at least some of the steps in an order different than that shown above. Additionally, some embodiments include different and additional steps as well.

After the search completes, the following steps are used to fill in as many remaining student requests as possible. Start with the finalized schedule "s".

1. Create an empty list "L" which will contain possible student request assignments to sections.
2. For each section "c" that has been scheduled in "s", use the filing function F(s, c) to list all remaining requests "r" that could be added to c, along with their score. Add each request assignment to L.
3. Sort L in descending order of score produced from F(s, c).
4. Consider each possible request assignment "r" in L in descending order of score. If the student request in "r" has not already been assigned to a different section, and the assignment is still legal (the course is not full and the student has the timeslot open), then assign the student request to the section specified in "r."

Although the steps listed above are numbered, some embodiments of the fill procedure perform at least some of the steps in an order different than that shown above. Additionally, some embodiments include different and additional steps as well.

Example Progress Score (P(s)) Implementation:

The scheduler requires as input a priority score for each student request. It also requires an "FTE_Weight" parameter to balance the value of scheduling teacher hours with student requests.

The function P(s) sums the total amount of teacher FTE fulfilled and multiplies it by the FTE_Weight parameter. It then adds that value to the sum of the priority of all fulfilled student requests and returns the result.

Example Remaining Score (R(s)) Implementation:

First, for each course, the number of student requests for that course that could be fulfilled in each timeslot are computed. That is, for course "a" and timeslot "b," the total number of students who have an unfulfilled request for course "a", and have timeslot "b" open are computed. This provides a rough approximation of the "desired" distribution of each course.

Next, each legal remaining section is enumerated. Specifically, every combination of course, teacher, room, and timeslot that could be legally added to the current schedule is explicitly listed out. Then, for each possible section, the probability that it would be scheduled in the final schedule is estimated. For each room-timeslot combination, the possible sections are weighted based on the "desired" distribution of the courses that can be legally scheduled at that place and time.

Then, the probabilities are normalized so that their sum is at most 1.0 for each teacher and room within a single timeslot. This represents conflict, where the resources of a teacher or room are under contention.

The result is a table containing every possible section and the approximate probability of that section being scheduled. The expected number of student requests that could be filled by the completed schedule is calculated by summing up the expected available seats for each course in each timeslot and comparing the result to the desired distribution mentioned above. The expected FTE for each teacher is computed by summing up the FTE value of all of the possible sections that they teach, multiplying each by the probability of that section being scheduled.

Example Fill Section (F(s, c)) Implementation:

This function makes use of another function which takes all unfulfilled requests for a single student and returns the expected number of them that can be fulfilled by the current schedule. It does this by using the "desired" distribution and section probability lookup table that are generated by the "remaining score" function.

It does this by estimating, for each unfulfilled request and each timeslot, the probability that there will be an opening for that request in the timeslot. It then uses this table of probabilities to estimate, for each request, the probability that no timeslots are available to fill it, or that all available timeslots have at least one conflict with other requests from the same student. This is the "conflict" probability for the request.

These conflict probabilities are then used to estimate the likelihood of each request being fulfilled, and, by extension, the expected number of fulfilled requests for the student.

The "fill section" function F(s, c) scores a student by estimating the expected number of filled requests both with and without assuming that they are assigned to section c. Their "score" is the difference between the two—the estimate of how scheduling them into section c affects the total number of their requests that are filled.

Another example method of generating a course schedule comprises generating a plurality of potential schedules based on teacher availability. In some embodiments, the plurality of potential schedules includes every combinatorial arrangement of teachers, courses those teachers can teach, and periods for scheduling those courses. After the plurality of potential schedules is generated, students are enrolled in each of the available based on course requests using one or more enrollment techniques. Each of the potential schedules is then assessed and assigned a score based on how well the potential schedule satisfies the course requests from the students. After the potential schedules have been assigned scores, a course schedule can be selected based on those scores (e.g., the highest scoring potential schedule can be selected).

Groups

A group is a collection of users with its own site page (e.g., a project group as has been previously described). In order to create a group, a user simply provides a name and description and then adds members. Groups each have one or more moderators, who can control group membership and specific group permissions. For instance, a group moderator may determine that the group's home page is publicly viewable but that a shared group workspace and discussion board are not. A moderator can independently control the visibility of each sub-page. Groups will generally find the standard widgets—HTML, slideshow, and navigation—of the most use. However, a "group members" widget will also help them to manage their membership effectively. Groups each have their own calendars.

Departments

Most organizations, and particularly districts and schools, use departments to organize their members. Departments are created at the parent organization/district level and selected by child organizations. A department is really just a specialized group, so it has all the same features groups do: a name, description, members, and its own site page. A department can be academic or administrative, which is merely an organizational aid to administrators. Because departments have two levels, the parent-level and child-level departments have different pages. It is possible, and likely, that the group of math teachers district-wide has different collaboration needs than the group of math teachers at a specific elementary or high school. Department-specific widgets include "department members" and "department courses."

Activities

An activity is another type of specialized group. An activity refers to an extracurricular student activity (e.g., "student newspaper," "basketball team," and so on). An activity has all the features of other groups, with the addition of the ability to manage requirements for students to join or remain in an activity. These requirements can take the form of an attendance requirement, a grade-based requirement, or a behavioral requirement. Requirements are created independently of activities and then attached to activities so that the same requirements can be re-used if necessary. For instance, a requirement such as "no failing grades" is probably common and will be applied to many activities. An attendance requirement can take the form of a minimum or maximum number of marks (e.g., "No more than 5 tardy marks" or "No more than 2 truant marks"). A grade-based requirement can take the form of a minimum or maximum number of specific grades (e.g., "No F grades") or a minimum GPA (e.g., "At least 2.5"). A behavioral requirement can take the form of a minimum or maximum number of specific incidents (e.g., "No fighting incidents") or a minimum behavioral point value. The requirements may be enforced when a user joins an activity or in an ongoing way as the user remains active in the activity. If the requirement is supposed to be enforced continuously, then whenever a user violates a requirement, s/he will be placed on probation from the activity, and the adviser/moderator will be notified. At that point, the adviser/moderator can make a decision about if and when the user will be admitted back into the activity group. If the user is admitted back into the group, any requirement counters that triggered a probation setting will be reset and begin counting again.

Discussion Board

Whenever a district, school, section, group, department, or activity is created, a corresponding discussion board is also created. This discussion board can be displayed or not on the appropriate site page at the moderator's option. The discussion board allows users to post text, images, and video in threaded conversations that are organized by topic. In addition, a board may either be moderated or un-moderated. If moderated, a moderator must approve comments before they are publicly viewable.

Internal and External Messaging/Automatic Messaging/Daily Memo

Communicating efficiently with the organization's members is an important function of any networking site. There are several ways users can communicate with each other and organizations can communicate with their members.

Internal and external messaging allows a user to send messages to another user. The user has an inbox/sent mailbox on the site, which displays any messages received and sent within the site. When a user clicks to compose a message, s/he may select another user's name or a group of users, such as all users in a particular group or section. The user may also click a checkbox, which, if checked, will copy the message to the parents of selected users. When sent, messages will be sent to the recipient's internal mailbox. Depending on whether or not the target recipient has chosen to receive messages externally or via SMS, the message may also be sent to the recipient's external email address or phone number of record. Internal messaging is intended for one-time messaging.

Automatic messaging is a feature that allows administrative users to set up recurring messages to users. For instance, it is common to send out automatic messages with the list of homework assignments for that evening at the end of each school day. An administrator can create an automatic message by indicating the message's subject and contents using a list of provided variables for commonly-generated data and whom to send it to. The user will also indicate the frequency at which the messages should be sent, such as monthly on a certain date, weekly on a certain day, or daily at a certain time. These messages will then be generated and dispatched according to the specified schedule.

The daily memo widget is a widget that allows an administrative user to post daily announcements to users based on their school membership and role. For instance, a user may wish to send the same message to all staff at a high school. The administrator may compose the text of the memo and pick an expiration date. Then, in the memo widget, users will see messages intended for them based on their role. They will only see messages that have been posted until their expiration date passes. So, if an administrator would like to be sure that a message is posted during a particular week, but then, the message will not be valid after the end of the week, this is a way to ensure that only relevant messages are displayed in the memo area so that it does not become unduly cluttered.

Attendance

The attendance module consists of administrative settings as well as actual attendance records. In order to set up the attendance module, an administrative user must define attendance groups and marks. Groups and marks are defined at the parent organization level and selected at the child organization level. Attendance groups are an aid for organizing marks. For instance, groups might include "excused absences" and "unexcused absences." Although the groups' names have no programmatic function, users provide a custom name and description for each group and define a sort order for display purposes.

After creating groups, a user will create marks. A mark is the actual indication of an individual's presence or absence on a particular date. Example marks include "Present," "Illness," "Tardy," "Truant," and so on. When creating a mark, a user will select a group to which the mark belongs and give the mark a name, abbreviation, and description. The user must also define whether the mark indicates presence or absence for reporting purposes. Marks can apply to students or staff or both. Users can also choose that a mark count as the default mark for either daily- or period-based attendance. The user will also define whether or not a mark is available for the teacher to assign on class pages or is only available to administrative users. Finally, the user will define a sort order for the mark for display purposes.

The attendance widget is where marks for individuals are recorded. The module is driven by the calendar settings and thus will only provide a place to make a mark if school is in-session on the date listed; otherwise, the reason school is not in-session will be displayed. The area to make a mark is an input area, but while most user interfaces would provide individual <select> boxes, we've instead implemented a function to pull up a modal when a user clicks the input area. This approach is not only much cleaner but also allows the user to select more than one input at a time—or even all of the inputs for one or more dates—and set them to the same mark. This provides a significant savings in time over traditional attendance interfaces. The modal allows the user to not only set the mark for each individual but also to set an arrival time and make any relevant comments. Attendance can be taken using either a daily or period mode.

The platform 102 also allows administrators to define "mark copying rules." These rules state whether or not to copy a particular period mark to a daily mark on a given day record within the calendaring system. These rules may be used, for instance, to copy the mark from the first period that meets each day to the daily mark so as to not to require duplicate work entering daily attendance marks.

Student Requirements

The "student requirements" module consists of several administrative settings widgets and two portal widgets.

The first of the administrative settings is the creation of course groups. Course groups are collections of courses that will be used in different ways in subsequent settings. They usually comprise courses that fulfill different sorts of requirements; for instance, all mathematics courses, English courses, or fine arts courses. A course group consists of a name, description, and member courses.

After creating course groups, an administrative user may define graduation requirements. Requirements are grouped together into graduation requirement sets so that different sets can be assigned to different students. For instance, a school may offer both a standard and honors diploma; if it does, there are likely different requirements to earn each type of diploma and thus, two requirement sets. Requirement sets consist of a name and description.

After having created requirement sets, an administrative user may next create requirements to belong to each set. Requirements may take one of nine different forms:

A total number of credit hours to graduate (e.g., 23.0 credit hours during 4 years of high school)

A certain number of credit hours taken from a certain course group (e.g., 3.0 credit hours of mathematics)

A specific course (e.g., all students must take health)

Service (e.g., 100 hours of community service)

Attendance (e.g., present in school at least 680 days during 4 years of high school)

Behavior (e.g., no more than 2 suspensions)

Activity (e.g., all students must participate in a particular activity)

Administrative (Fees Paid, Equipment Returned, Books Returned, or Course Evaluations Completed)

Other (custom requirement; e.g., "Senior Essay"—enter "Met"/"Not Met" manually for each student)

The user must supply a name and description for each requirement and then choose what type of requirement it is. Different additional information will be required depending on the type selected. For a "total credits" requirement type, the user will provide the number of credit hours the student must complete. For a "course group" type, the user will provide the number of credit hours and the applicable course group. For a "specific course" type, the user will specify the course and, if applicable, the minimum grade the student must earn. For a "service" type, the user will specify the number of service hours the student must log. For an "attendance" type, the user will specify the minimum total number of days a student must be marked as present during his/her years at the school. For a "behavior" type, the user will specify the maximum number of various incident types in which a student can be cited as an offender. For an "activity" type, the user will specify a specific activity in which a student must participate. For example, a student may have to be a member of National Honor Society in order to earn an honors diploma. Each of the administrative types of requirements (fees, equipment, books, course evaluations) is binary—either the student has done these things or not—so if the requirement is added, there is no additional information required. Finally, for an "other" requirement type, the user also need provide no additional information, since the name and description will suffice, and completion will be recorded manually.

In addition to graduation requirements, an administrator may also define "per-year" requirements. These requirements work in a similar way and may include some or all of the same types as do graduation requirements. However, per-year requirements are linked to a specific grade level, breaking down graduation requirements so that one can determine whether or not a student is on-track for graduation early on and before the student is in danger of not graduating. For instance, if a student must take 4.0 credits of English to graduate high school, the administrator may set a per-year requirement of 1.0 credit per year of high school.

The administrator must also define course prerequisites. Prerequisites include a course to which the prerequisite requirement applies, a description, and a type. There are three types of prerequisite relationships: a prerequisite, co-requisite, and recommendation. A prerequisite can take either the form of another course (e.g., a student must take Algebra I in order to take Algebra II), in which case the administrator may also define a minimum grade the student must earn in the first course in the relationship. A prerequisite can also take the form of a minimum grade level the student must be in in order to take a course (e.g., AP Government is only available to seniors). A co-requisite requires that if a student enrolls in one course, s/he must also enroll in a second course (e.g., if the student selects French literature, s/he must also enroll in French language). A co-requisite may be reciprocal or not, meaning it may or may not be bidirectional. A recommendation is a requirement that the student get a recommendation from a teacher in the department to which the course belongs in order to enroll (e.g., in order to enroll in Honors English, the student must get a recommendation from a teacher in the English department). A prerequisite may optionally be set to allow concurrent enrollment in the preceding course to override the requirement. All of the requirements may optionally be set to allow the teacher's permission to override the requirement.

The administrator may also define the school's "scope and sequence." This is a document often found in schools' course catalogs or student handbooks which explains the range of courses offered and the order in which students should progress through them. For example, in high school, a student may be able to choose between a regular and an honors English sequence. However, the actual courses taken need not be identical for every student who chooses the same sequence; sequences often incorporate choices at certain steps in the sequence:

| | SEQUENCE | | | |
|---|---|---|---|---|
| | 1 | 2 | 3 | 4 |
| Regular English | English 9 | English 10 | English 11 American Lit. British Lit. Folklore | English 12 American Lit. British Lit. Shakespeare Hemingway |
| Honors English | Hon. English 9 | Hon. English 10 | AP English Lang. | AP English Lit. |

In order to build a scope and sequence document, the administrator will define the name and description of a sequence and then add courses to the sequence. Each course added to the sequence must be mapped to a specific step to indicate its order; a course may belong to more than one step, indicating that there are multiple times during the sequence at which a student could choose to take it.

Another administrative widget in the student requirements module is that of the settings for the multi-year plan. The multi-year plan is a document that belongs to each student outlining what courses that student plans to take during each year at the particular school. It is a planning document for the student and parent, usually constructed under the advice of a counselor, indicating which courses the student will take and when to make sure the student has a plan to complete required courses and prerequisites on time. In the multi-year plan settings widget, the administrator will define the name of the plan (in case a school allows more than one plan), the number of years the plan will span, and the grade level each year of the plan maps to.

This concludes the administrative settings in the student requirements module, however some embodiments may include different or additional widgets. Additionally, some embodiments include two related portal widgets: graduation/per-year requirements and the multi-year plan.

The graduation/per-year requirements widget is a view of the requirement sets that have been assigned to a particular student and his/her progress towards meeting those requirements. If the student has been assigned a particular requirements set, such as "Regular Diploma," then the student will see the requirements in that set and a progress indicator, such as 3.0/4.0 credits and a progress bar, such as a bar filled to the 75% mark. There will also be an indication next to each requirement of "Met" or "Not Met," and a user with the appropriate permissions settings, such as the user's counselor, could manually set a requirement to "Met" if needed. The student may also be assigned to two requirement sets, such as "Regular Diploma," and "Honors Diploma," so that progress towards both is tracked. This way, if the student is attempting to earn the honors diploma but only completes the requirements for the regular diploma, the student, parent, counselor, and others tracking the student can see that the student is at least still on track for one type of diploma. In the case that a student is assigned to two requirement sets, if the sets have similar requirements, the judgment of whether or not a specific requirement has been met is cumulative, not summative. For instance, if a regular diploma set requires 3.0 credits of mathematics while an honors diploma requires 4.0 credits of mathematics, the student will only need one additional credit beyond the 3.0 required for the regular diploma—and not 7.0 credits—in order to meet the mathematics requirement in the honors diploma.

A student may be assigned to one or more graduation requirement sets and to one or more per-year requirement sets. The student's progress towards every set is independently tracked, and the user may filter the display to view the appropriate set.

The multi-year plan widget is intended to be a living document that the student will edit throughout his/her years spent at the school so that s/he can continue to plan to meet requirements. The student will see headings for each year of the plan, and the student may add courses to each year, indicating which courses the student plans to take when. The student may only add courses to his/her current grade level or a future grade level in the plan; whatever the student entered in the plan at an earlier date, a previous year (e.g., 9th grade when the student is in 10th grade) will show the courses completed instead of the courses the student planned to take at some earlier time.

Each course entry in the plan is checked against various criteria in order to make sure it is a valid choice.

First, courses are checked for prerequisites, and if the student has not either completed or planned to complete the prerequisite for a particular course in some slot earlier than the student plans to take that course, an alert will appear, informing the student that s/he will likely not be able to take the course due to the lack of a prerequisite. The platform 102 may also check that the student has chosen to take courses in an appropriate order, as dictated by the school's scope and sequence. If the platform 102 finds a violation of the scope and sequence, it will also alert the student, suggesting that s/he plan to take the course at a different time.

Second, each year of the plan is checked against per-year requirement sets and sequencing to ensure that a student has planned to meet his/her per-year requirements. If this is not true, then the platform 102 may display an alert (or otherwise notify the student), informing the student that his/her current plan does not meet his/her assigned per-year requirements. For instance, if 6.0 credits are required each year, and the student has only selected 4.0 credits in a particular year, the platform 102 will inform the student that s/he is credit deficient in that year.

Finally, each multi-year plan is checked against graduation requirements, and if the student is missing plans to meet any requirement, then the platform 102 will also alert the student to this fact.

The "My Course Requests" widget is yet another portal widget that is not strictly part of the student requirements module, but may be driven, in part, by the multi-year plan and scope and sequence. When the student accesses the course request widget to make requests for the following academic year, the platform 102 may display recommendations for the student to consider in that widget. The platform 102 may generate recommendations based on the student's multi-year plan, the school's scope and sequence document, and any recommendations the student has received. For instance, if the student will be entering 10th grade and indicated a plan to take Algebra II in 10th grade, then the platform 102 may recommend that the student request that course. If the student has completed French I the year prior, the platform 102 may check for a sequence that lists French I, and finding that French II is the next logical course, the platform 102 may recommend that the student request French II. Finally, if, for instance, the art teacher has entered a recommendation that the student consider taking ceramics, the platform 102 may also display that recommendation for the student. In some embodiments, each recommendation is accompanied by text explaining why the recommendation is being made. To act on the recommendation, the student may simply click the icon next to the recommendation in order to request that course.

Physical Resources/Facilities Management

The "physical resources" module includes the ability to track various resources (buildings, floors, facilities, rooms, lockers, equipment, and textbooks) and the ability to create and track work order requests (e.g., maintenance, IT, etc.).

An administrative user defines a building by providing the building name and number of floors as well as a name for each floor. Upon entering each floor, the user may also upload one or more images, such as the floor plan and schematic so that everyone can access information pertinent to emergency planning. Buildings are defined at the parent organization level and selected by the child organization.

Having entered a building and its floors, an administrator may also define rooms. A room belongs to both a building and a floor, and the administrator will also define the room name/number and maximum capacity. Once a building's rooms are defined, whenever a school selects a building to use, those rooms come with the building.

Facilities are special characteristics of rooms. For instance, examples of facilities include a computer lab, chemistry lab, woodshop, kitchen, or planetarium. A user creates facilities in the physical resources area and then attaches facilities to rooms to indicate that the facility is available in that location. This is used to help users select appropriate rooms for courses or room reservations.

An administrative user can also enter all the lockers in a school. The user will first define locker types: for instance, regular lockers and gym lockers. Then, the user will enter the actual lockers, defining the locker type, number, list of combinations (of which one will be marked current), the building and floor where the locker is located, and its status (e.g., active, inactive, requires repair, etc.). The user may also optionally link a locker to a homeroom bank. Once a locker is created, it can be assigned to one or more students. Lockers may also be automatically assigned to students by running a script; if automatically assigning lockers, the building and floor is useful because the user can dictate that disabled students must have a locker on a certain floor (e.g., ground floor for physically-disabled students). If the user is scripting locker assignments, assigning each locker to homeroom bank is helpful because this will ensure that students are matched to a locker in their homeroom bank, either alphabetically or randomly as specified, so that they are assigned to lockers in the proper vicinity in their school.

Positions

The positions module is used to manage the positions staff members fulfill in their organizations. Positions are created by the parent organization and selected by the child organizations. To create a position, and administrator simply provides a name. Positions are used in the permissions module, which is described elsewhere herein.

Levels

The levels module is used to indicate the type of school with regards to ages of students served. The parent organization selects all levels that will be available to child organizations, and then child organizations each select one level to use. For instance, a district may indicate that there are elementary, middle, and high schools within its organization, and then each school will indicate which type describes it.

Behavior/Concerns

The behavior module facilitates the tracking of both positive and negative incidents and the accrual of points and/or consequences as appropriate. An administrator will generally start by setting students' initial point values. The user can reset students' point values at any time, but it will apply to all students; normally, this is done at the beginning of the academic year. The administrator also curates a list of incidents. Incidents are behaviors students engage in and can be positive or negative (e.g., "disrespectful speech," "fighting," or "helping a classmate"). To create an incident, the administrator provides a name, indicates whether the behavior is positive or negative, and gives the behavior a point value, for example, −10 points, meaning that when the student engages in this behavior, 10 points will be subtracted from his/her overall point value.

The administrator will also curate a list of consequences. Consequences result from incidents, usually automatically, but can also be assigned to students manually. A consequence can also be positive or negative (e.g., "detention" or "merit award"). An administrator creates a consequence by providing a name, description, and indication of whether the consequence is negative or positive. Then, having created a consequence, the administrator can next add incident and points guidelines. An incident guideline states that when the student has accrued a certain number of incidents of a specific type, the consequence will be assigned to him/her. A points guideline states that when a student's point value reaches above or falls below a certain number, the consequence will be assigned to him/her. Once a consequence has been assigned to a student due to having reached a particular incident count, the counter for that incident type will be reset.

Once incidents and consequences have been defined, users may use the "submit incident" form to file incidents against students. An incident form requires that the user identify the incident type, primary actor, and, if applicable, secondary actors, the incident reporter, the location and time, and the description of the incident. If applicable, the user may also report the victim(s), witness(es), images of the incident (e.g., in the case of an assault or vandalism), and any aggravating circumstances (e.g., drugs, alcohol, weapons, etc.). After an incident has been reported, additional information may be reported regarding actors or witnesses, such as injuries sustained or specific actions taken (e.g., a hearing, police report, etc.). On the incident report form, the user can check "notify parents" in order to send an email notifying the actors' parents about the incident. The "incident management" widget allows those with administrative access to review incidents submitted, with some filtering abilities, such as by date, student, reporting staff member, incident type, and so on.

The "My Behavior" widget is a portal widget that displays incidents and consequences that a particular student has accrued.

While the behavior module is rather formal in the types of incidents reported, some embodiments also provide a more casual module, that of "commendations and concerns," to identify other areas in which a student may be excelling or may need to address. The concerns module set-up widget allows the administrator to define the various types of concerns that users may submit. These are very similar to incidents in the behavioral module but may be somewhat more general (e.g., "academic," "behavioral," "dress code," etc.). After the concern types have been defined, other users—generally staff members—may submit concerns, usually directed at students, though not required to be used in this fashion (a simple modification could allow supervisors to use this module to report concerns directed at staff also). As user can submit a concern by providing far less information than one would in order to submit an incident. One need merely identify the student and the concern type and provide some narrative comments. The "concern management" widget allows those with administrative access to review concerns submitted, with some filtering abilities, such as by date, student, reporting staff member, concern type, and so on.

Portal Widgets

Although most widgets can be placed on any site page, there are a variety of widgets that are particularly useful on individuals' portal pages. These include:

Biographical: The biographical widget stores the user's name fields, birthdate, age, gender, ID numbers, race, and ethnicity.

Assigned to: The assigned to widget stores the user's current grade level, graduation year, homeroom, gifted and talented program assignment, counselor, adviser, case manager, and locker assignments.

Parents/Guardians: The parents/guardians widget lists parents or guardians of the student, the parent's relationship to the student, and privileges of that parent or guardian relating to the student (e.g., pick-up, custody, emergency contact, mailings, and online access).

Siblings: The siblings widget lists other users who are siblings of this user with the relationship to this user.

Languages and Citizenship: The languages and citizenship widget stores the user's native, primary, and secondary languages, birthplace, citizenship, and social security information.

Contact Information: The contact information widget lists the user's phone, email, and physical address records. The user may have one primary form of contact for each of those types.

Enrollment History: The enrollment history widget lists the various schools the user has attended, including entry and exit dates, graduation year, last grade level, and status/exit reason. This widget is also where historical grade level information, or which grade level the student was assigned to in each academic year, is stored.

Employment History: The employment history widget lists various places the user has been employed, including the entry and exit dates, position held, and status/exit reason.

Allergies: The allergies widget lists the user's known allergies.

Medical Professionals: The medial professionals widget lists medical providers with whom the user has a relationship. The name of the provider, his/her area of practice, and contact information may be displayed in this listing.

Medical Exams: The medical exams widget provides a record of physical, hearing, and vision screenings as well as nurse's office visits. The physical exam report includes vital statistics (e.g., height, weight, blood pressure, clearance for athletic participation, etc.). The hearing screening includes the results of the screening for various frequencies, and a user may produce an audiogram from the recorded data points by simply clicking to view the chart. The vision screening includes the user's results of screening both with and without lenses as well as any related diagnoses. The nurse's visit report includes the reason the student was seen and any actions taken. Exam records may include the date and time they occurred and the name and position of the practitioner.

Medications: The medications widget lists any medications and dosages the user is currently prescribed. In addition the medication, the start and end date as well as the number of administrations per day and their timings is listed. This produces a chart, in which the person responsible for administering medication (usually a school nurse) will be able to record whether or not the student received the medication at each scheduled time.

Immunizations: Every state has different immunization requirements, and the dosing rules for immunizations are quite complicated (e.g., some states may require that the user receive four doses of a certain vaccination, and that the fourth dose must occur within four days of the user's first birthday and that if this is not done, the user receive a fifth dose). The platform 102 may include the state-level requirements (which may be entered by staff members who are familiar with state immunization requirements). Alternatively, operators of the platform 102 may enter or adjust the requirements. In the user's immunization widget, the vaccinations and dosing schedule applicable to the state in which the school is located are displayed. If, for instance, the user is required to receive four doses of a certain vaccine, there will be four spaces to enter dates the vaccine was received. The immunization widget calculates, based on the dates of vaccination provided, whether or not the student is in compliance. Most states also allow waivers under specific circumstances (e.g., religious, disease history, personal, etc.). Thus, waivers can also be recorded in this widget.

My Course Requests: The "my course requests" widget in also described elsewhere herein (e.g., in the section on the multi-year plan). However, in addition to recommendations regarding which courses to request, the course request widget is where a user requests courses for the following academic term. An administrator will have defined the dates between which requests may be made and the types of requests allowed for the student's grade level. For instance, if sixth graders have two choices of an English course, two choices of a math course, one choice for science, one choice for social studies, and may choose two of several electives, the course request widget will display six spaces in which students can enter choices, with their options for each space restricted to the courses the administrator has determined are valid.

My Section Enrollments: The "my section enrollments" widget lists the student's current section enrollments, including the timetable, teacher(s), and room.

Course Schedule/Calendar: The calendar widget is described in greater detail elsewhere herein. When a calendar widget is placed on the user's page, it automatically displays the calendars of sections and activities in which the student is enrolled. The school events and other calendars are also available for display.

Multi-Year Plan: The "multi-year plan" widget is also described elsewhere herein (e.g., in the student requirements section of this document).

Graduation/Per-Year Requirements: The "graduation/per-year requirements" widget is described elsewhere herein (e.g., in the student requirements section).

Service Hours: The "service hours" widget allows the student to record service activities in which s/he participated. The user will record the name of the activity, the date on which s/he participated, and the number of hours. For instance, "served meals at the homeless shelter, 3 hours". The widget totals the number of hours and uses this in conjunction with the "graduation/per-year requirements" widget if service is required of the student in order to graduate.

Activities: The "activities" widget lists the activities in which the student is participating. It includes the status as either active, on probation, or a past activity.

My Attendance Summary: The "attendance summary" widget provides a list of the marks the student received on each date, by month, as well as year-to-date summary of the number of each type of mark received.

My Grades: The "my grades" widget lists the student's grades for each grading period for courses that reported grades in that period. These grades are then used to calculate the student's GPA both for that grading period and cumulatively for some or all of the years the student has been at this school. By clicking to "view calculation," the student can see a detailed breakdown of how the GPA was calculated, including the grade points and credit hours used, and a fractional set up showing the actual mathematical operations performed.

My Behavior: The "my behavior" widget is described elsewhere herein (e.g., in the behavior section).

Profile Widgets

Although most widgets can be placed on any site page, there are a variety of widgets that are particularly useful on individuals' profile pages. These include:

About Me: The "about me" widget allows free-text entry in which the user can list his/her personal biography for other site users' consumption.

Teaching Philosophy: The "teaching philosophy" widget also allows free-text entry in which the user can explain his/her educational principles; generally used by staff only.

Office Hours: The "office hours" widget allows a staff member to indicate his/her availability to students and parents who wish to make an appointment.

Favorite Lessons/My Lessons: The "favorite lessons/my lessons" widget allows a user to identify both his/her favorite lessons on the site as well as lessons that the user has created.

Favorite Assessments/My Assessments: The "favorite assessments/my assessments" widget allows a user to identify both his/her favorite assessments on the site as well as assessments that the user has created.

My High Scores: The "my high scores" widget allows a user to display his/her successes with regard to assessments completed.

Take-A-Call: The "take-a-call" widget allows users to post their interest in helping other users in their areas of expertise. A user who is willing to take a call may post his/her area of expertise and availability. Then, a user who would like to receive mentorship can request a call, and the two can schedule a phone call at a mutually agreeable time.

Curriculum Management: Units and Lessons

A learning/teaching platform has two essential parts: lessons, which convey information to students, and assessments, which assess students' understanding of the information they've consumed. In order to manage these curricula, users create "units."

A unit organizes an area of study for a teacher to help him/her plan instruction; it is usually created by a group of teachers (e.g., a department) under the guidance of a director of curriculum. A unit usually spans anywhere from several days to several weeks of instructional time. The unit has metadata—a name and description and is tagged with the applicable grade level(s), department, and subject. In addition, a unit includes a pacing guide; a pacing guide tells the teacher which topics to teach each day of the unit and provides some suggestion of how to teach the topic: for example, by indicating which resource to use. A unit also lists the standards that it addresses and the various resources a teacher will use to teach. In the platform 102, possible resource types may include a video, an audio file, a document, an assessment, a lesson, and a link to file hosted by a third party (e.g., Google Drive).

A lesson is very similar to a unit, but it is intended to cover much less material: for example, one concept, rather than the collection of concepts that make up a unit. While a unit may teach a number of standards, a lesson usually focuses on one, may be two standards, if they are closely related. A lesson is something either that a student should be able to consume in a short period of time or that a teacher should be able to teach in 1-2 class meetings. A lesson is composed of its metadata—its name, description, grade level(s), department, subject, and associated standards. It also includes one or more resources. Again, resources may take the form of a video, an audio file, a document, an assessment, a lesson, a link to a file hosted by a third-party service such as Google Drive, or a link to an external Web page.

In some embodiments, the units or lessons may be associated with one or more assessments (which are described below). Some embodiments include a searchable directory of curricular resources (e.g., units, lessons, assessments, etc.).

Assessments

Once a student has consumed material in the form of a lesson—whether the lesson is delivered via software or via a teacher—an assessment activity serves either to allow the student to practice applying his/her new skills or knowledge or to confirm that the student has learned. The platform 102 may include assessments such as assessments created and published by staff members or other experts. Additionally, the platform 102 may allow users to create and publish their own assessments for use at various levels such as within a class, department, school, school district, geographic region, or otherwise. Assessments include metadata—a name, description, grade level(s), department, subject, and associated standards—as well some statistical data, such as the number of users who have completed an assessment, their average score, their average time taken, their average rating of the assessment's quality, and any number of user-generated reviews. These data allow other users to search the collection of assessments to find assessments to fit their needs.

The platform 102 provides tools to allow users to create a variety of different types of assessments because different skills are assessed in different ways. Different types of assessments need not be disparate; they can be combined on the same assessment because each "question set" can be its own type of assessment.

In some embodiments, an assessment engine operates to assess understanding of one or more topics by an individual student or any group of students, the assessment engine may be configured to present a student or group of students with questions and to receive answers to the questions. In some embodiments, a group of students includes the students in a class, a school, a school district, or a state. The group of students may be further defined based on demographic characteristics, such as gender, race, socioeconomic status, disability, etc. In some embodiments, the assessment engine is configured to display these results in a meaningful way to users (e.g. by producing charts, graphs, and other summary forms).

A user begins to create an assessment by creating an "assessment type;" s/he will choose the type of assessment questions this set will containg standard, visual identification, flash cards, text identification, reading fluency, lists, and fill-in-the-blank. Each question set may be preceded by a heading, which, just like on a traditional paper-based assessment, divides the questions into separate sections to make a distinction to the student.

Within a question set, a user may add instructions and/or a context that applies to all the questions in the set. A context may contain some text, an audio recording, an image, some math notation, or a video. If the context is not text-based, then the user may also add some additional text to describe the context. An example of this use is if the user desires that students watch a video and then answer three questions, all based on the same video. Instead of creating three questions that all contain the video, the user need only insert the video once and then proceed to ask several questions about it.

A standard question set contains questions and answers, both of which may be of any type of media: text, image, audio, video, or math notation. It's clear that teachers may have a need to pose questions that use these different types of media. Although text-based questions are the most common, world language teachers in particular will find audio and video questions useful while math teachers will certainly want to be able to post math problems in their correct notation. Fine arts, natural science, and social science teachers will likely find image questions useful.

Answers may also take the form of any media. The teacher may design a multiple-choice assessment in order to provide students more support, or the teacher may ask students to submit free-response answers in the form of text, a drawing, audio, or math notation. One can imagine a student submitting a text response to any question to which the teacher would like the student to explain his/her thinking; a drawing is useful when the teacher would like the student to submit a diagram, as in a physics force diagram; an audio response is often desirable when judging students' ability to speak a world language; and a math notation response is appropriate on a math assessment. While multiple-choice questions can be scored automatically, free-response questions require a teacher's review. If the teacher has chosen to use a multiple-choice mode, s/he may select more than one correct answer.

All questions are mapped to a standard; this enables assessment analytics, which is discussed elsewhere herein.

All questions may also contain a hint. When students take the assessment, if a hint has been added to the question, the student may view the hint. When the teacher reviews the student's assessment results, s/he will be able to see whether or not the student accessed the hint.

All multiple-choice answer choices may contain a guide. A guide provides specific feedback based on the answer the student selected. Suppose, for example, that a question poses a math problem: 3^4. Suppose also that the student selects 12 as the answer. A guide that would appear when the student selects the answer might state: "You multiplied 3 times 4. Remember, 3 raised to the 4th power means that you multiply 3×3×3×3." If the student had answered the question correctly, the teacher might also provide a guide either complimenting the student for good work or providing some other related information to extend the problem. Guides help to personalize the learning experience for students in an immediate way, providing feedback that is similar to what a tutor would provide without requiring the same kind of human time investment to power the exchange.

When building an assessment, the user interface allows the user to re-order both questions and answer choices by dragging and dropping them into the desired place. The text may be formatted using the standard styles: bold, italic, and underline, as well as superscript and subscript.

In addition to standard questions, the platform 102 supports several other types. A visual identification assessment allows the user to create his/her own interactive image map. This is useful when the teacher would like the student to interact with a map or diagram. The user uploads an image file of his/her choice, and then is able to define areas on the image that the student will be able to click. The user defines the "clickable" areas by clicking points to create a perimeter. Once the user has finished clicking around the entire perimeter of the desired area, the user will click "generate" in order to generate the clickable area. Once the area has been generated, the user will enter some text to identify the area. For instance, suppose that an elementary school teacher would like to create a clickable map of the United States. The teacher would upload the map and click around the perimeter of each state, entering the state's name for each clickable area. In a visual identification assessment, the generated clickable areas serve as the answer choices available to the student. Then, the teacher may enter as many questions as desired, and for each question, the image with its answer choices serves as the asset with which the student interacts. For example, the student may be shown the prompt "Wisconsin" and will then have to click on the image map within the perimeter of Wisconsin in order to provide the correct answer.

Another assessment type is flash cards, which facilitates one-to-many correspondence (e.g., vocabulary word, definition, part of speech, etymology, audio pronunciation, image, and example sentence). This is somewhat different from traditional flash cards, which only facilitate one-to-one correspondence (e.g., vocabulary word and definition). The flash cards are created in a one-to-many correspondence model because students learn to associate information in a variety of ways, and changing which datum serves as the prompt and which as the answer allows students to be exposed to the data differently and increases retention. In order to build a flash card assessment, one must first create (or select an existing) content set. Content sets may contain fields pertinent to each item the student needs to learn. For instance, to continue the vocabulary example, each one of the word-definition-additional-data collections is an "item;" the "word," "definition," "part of speech," and so on is each a "field." To create a content set, one provides the appropriate metadata—name, description, and associated standards—and then names each field and selects the type of data each field should hold. Fields can accommodate text, image, audio, video, or mathematical notation. After the content set has been created, it can then be imported into a flash card assessment, and the user can choose which field will appear on the "front" of the card (e.g., which field will serve as the prompt) and which will appear on the "back" of the card (e.g., which field will serve as the answer). The user can choose to display more than one field as the prompt but only one field as the answer, for obvious reasons. Wrong answers will be generated via a random selection of the same field from other cards, but wrong answers that appear to be the same answer will be excluded. For instance, if two math facts flash cards—4×3=12 and 2×6=12—the two 12s are stored in the database as different answers; however, the platform 102 will not display more than one 12 as a possible answer so that it will not be possible for the student to select a correct answer that would be recorded as incorrect.

Another assessment type is text identification, which facilitates student interaction with text. This is most obviously lends itself to grammar activities. For instance, a student may need to identify specific parts of speech, phrases and clauses, or grammatical errors. To build a text identification assessment, the user will enter instructions (e.g., "Identify the noun(s) in this sentence."). Then, the user will supply a sentence (e.g., "The boy ran to the wall."). Once the user has entered the sentence, the platform 102 "generates" the sentence, making each word and punctuation mark "clickable." The user may additionally drag words together to create longer "clickable" segments (e.g., phrases or clauses). When the text is displayed to the student, the student will be able to click on a particular part of the supplied text to identify the desired word/group of words or error. If the user has indicated that the student is identifying an error, the user can enter one or more acceptable corrections; when the student clicks on the error, an input area will appear for the student to enter the correction, which can either be scored against the teacher-supplied options or saved for later review by the teacher.

Another assessment type is reading fluency. This assessment type is intended to guide beginning readers with a variety of supports. In order to create a reading fluency activity, the user must supply the text the student will read. Among the supports students might use in the activity are highlighting, audio accompaniment, a glossary, and accompanying images. Traditional reading software has previously offered students the ability to see words highlighted as they read; however, this software generally highlights a set number of words at a time (e.g., three words), then the next set number of words, and so on. In contrast, the platform 102 enables variable highlighting, which allows the assessment creator to mark the highlighting boundaries so that words can be highlighted in groups or phrases that reflect the way someone actually reads, with a different number of words highlighted each time. A student can control the highlighting speed. Audio accompaniment will match the current highlighting speed. In a reading fluency activity, the creator can supply definitions for words s/he anticipates will be difficult for the student. The creator can also supply accompanying pictures that may help the student contextualize what s/he is reading about.

When the student accesses the reading fluency assessment, s/he will be asked to predict what the passage will be about, having had access to the title, glossary, and pictures. Then, the student will read the passage, choosing to enable or disable the highlighting and audio accompaniment. If the teacher has requested it, the platform 102 asks the student to read aloud, recording the student's response, and sending that audio file to the teacher's grade book for review. The total time the student spent reading the passage may be recorded and the student's word per minute (wpm) speed may be calculated. If the student has a webcam, the platform 102 may record the student's eye movements to create a heat map indicating which parts of the text the student spent the longest time looking at. Finally, when the student has finished reading the passage, the platform 102 may ask the student to write or speak answers to comprehension questions the creator has entered, and these will also be sent to the teacher's grade book for review.

Another assessment type is a list assessment. A list assessment is used to help students remember collections of information. Lists may be unordered: for instance, name the 20 amino acids. Or, lists may be ordered: for instance, name the first 10 amendments to the U.S. Constitution. In either case, the user will enter a prompt, like one of those provided above. Then, the user will enter the correct response and indicate whether or not order matters. If the list is an unordered type, the student will be supplied with the proper number of spaces to enter all the items in the list. If the list is an ordered type, there are two modes of operation. Either, the student will have to simply type all of the items in the correct order. Or, the student may view all of the items in the list and drag and drop them into the proper order. If the assessment is an ordered drag-and-drop assessment, the teacher is allowed to provide images, audio, video, or mathematical notations as the items to be ordered. The mode of use depends on the teacher's setting when s/he assigns the assessment.

The final type of assessment from which users can choose is the fill-in-the-blank assessment. Most people are familiar with these types of questions from school, but there are two different modes of use for this question type as well. First, a student may simply have to type or choose from multiple answer options the correct item to fill the blank, and the choices will be independent of each other. That is, even if there is more than one blank in a single question, each blank will operate as if it were its own question. Second, the student may have to choose from multiple answer options that are dependent on one another; this question type is common on the SAT® test administered by the College Board of New York, N.Y. In this case, the student is provided a variety of answer options, each with an option for each blank, and the student must choose the best combination rather than the best independent word or phrase for each blank.

Assessment Analytics (Student Performance)

An advantage available in some embodiments that include hosting assessments online is being able to analyze the results programmatically to provide patterns and insights that would be difficult for a human to discern. Thus, the assessment analytics module is used by teachers in their section pages to view the performance of individual students and of a class of students, and it is used by administrators, usually to view the performance of larger groups of students, though they can also filter to individuals. The assessment analytics module is an example of an analysis engine.

When a user accesses the student performance widget, s/he will select the group of students s/he wishes to see. Users may hand-pick individual students to make one's own group or may apply filters to gender, race, grade level, and specific section/teacher to create a group that satisfies that criteria. Once the user has selected a group of students to analyze, the user will then select an assessment those students have taken in order to view their performance.

A simple summary of student performance such as number of questions correct out of the total number of questions asked is easily displayed in the grade book without the aid of analytics software. This widget, in contrast, displays how the selected students answered each question on the assessment. The questions are divided by the standard or skills each question was designed to assess. Thus, if on an English examination, there were several questions that assessed students' ability to recognize comma splices and several other questions that assessed students' ability to recognize non-parallel construction, then there would be two categories in the analytics result screen, showing the questions that related to each skill in those two separate groups. For each question within the group, the number of students who answered the question correctly or incorrectly or omitted the question all together may be displayed. Under the heading for each question, the user may click to see a detailed report (called a "Who Report") to see how every student answered the question as opposed to simple percentages of those who answered correctly or incorrectly. Additionally, under each standard/skill category, the user may click to see a detailed report (called a "Breakdown Report") to see how every student answered every question within that standard/skill. Within this Breakdown Report, the user may click the column headings to sort based on the answers the students gave and therefore see whether or not one incorrect answer was chosen more frequently than other incorrect answers. This can help a teacher or administrator determine the nature of the students' misunderstanding rather than simply being told that the student misunderstood. Beneficially, the platform may answer (or help answer) the question, "In what way did the student not understand the material?"

By pulling up these reports for various groups of students and assessments, the teachers and/or administrators can begin to see a variety of patterns, but searching the patterns oneself is still time-consuming. In some embodiments, the platform 102 also employs algorithms to alert users to patterns in student performance. The platform 102 may generate a table that lists both students and standards that are appropriate for those students based on their grade level; then, in a grid-like format, the administrator can be shown which students are less than proficient, proficient, and better than proficient with respect to each standard. In some embodiments, the platform 102 can also display this information in several alternate formats. The table can be displayed for various groups of students, by gender, race, grade level, and teacher, which is useful for administrators, for whom a listing of hundreds of students would quickly become overwhelming.

The platform 102 allows performance analysis by these subgroups and any other fields stored in the database 106. In some embodiments, student performance can be analyzed in the context of which teachers' students are performing better. Beneficially, this analysis may lead to insights regarding whether the performance differences are based on intrinsic characteristics of the students or some difference in teacher training or teacher practice. Additionally, because the platform 102 tracks professional development (described elsewhere herein), the analytics can be used to evaluate whether or not a teacher participating in a particular professional development offering appears to impact student performance. Certainly, these analyses are not foolproof; many factors can affect student performance. In theory, districts could use this data, in conjunction with their other teacher evaluation data, to make hiring, firing, and compensation decisions. The platform 102 may provide the data to aid in teacher evaluations.

Users can also filter to a smaller subset of the standards rather than all of the standards applicable to a student or group of students, which can be many standards.

In some embodiments, this table can also be displayed for a single student so that the student or his/her teacher or parent can see where his/her trouble spots are. For each standard, the user can also click to see a list of additional lessons or assessments that target that standard and then assign those. This is what is termed in the industry "adaptive learning."

The platform 102 provides teachers and students the information to adapt learning based on student performance. The platform 102 can do so using a library of lessons or resources that the users create and share with others. Each resource (unit, lesson, assessment question) is tagged (e.g., for example by the teacher or other user who created it) with a standard/skill. After evaluating the questions students miss on assessments, the platform 102 searches and recommends that students utilize other resources tagged with the same standards. A teacher can use this approach in aggregate to decide how to modify instruction for an entire class; a teacher or parent might also use this approach to help a single student; a student can also use this information to drive his/her own learning choices. Allowing a teacher to modify instruction by using his/her district's curricula means that it will happen more naturally and frequently because modifications need not be approved through bureaucratic processes.

Prizes/Competition Management Platform

Although many teachers would argue that learning is its own reward, students often respond to incentives for learning, and the ability to create competitions among a student's peer group, with prizes for strong performance, can motivate students to work harder to learn the material. Thus, any user can sponsor a competition that will be open to other users of the sponsor's choosing.

To create a competition, the user simply names the competition and enters the following information: start date and time, end date and time, assessment activity to use, users eligible to compete, whether or not the assessment may be completed multiple times, number of winners allowed, and a prize. Users are encouraged to offer non-monetary prizes, such as classroom privileges (e.g., the opportunity to be attendance monitor, etc.) or tickets to a school event. The user may choose eligible users as all users from a particular school or course or section or a custom group of individuals. At the start date and time of the competition, eligible users will have access to the designated assessment. They will complete the assessment one or more times, according to what the sponsor has allowed, and they will continue to see a leaderboard showing the top several students and the scores those students earned until the competition closes. At the end of the competition, the winning student(s) and the sponsor will be notified so that the prize(s) can be awarded. The winning student(s) will also receive a badge (a small image) that will be displayed in their high scores widget on their profile pages.

Fees

Schools levy fees for a variety of programs and items, among them, fees for courses and/or materials, equipment, meals, parking, and so on. Administrators begin setting up their fees by creating fees, which have a name and description. Then, a fee instance is created by attaching the fee to the item it is for—e.g., specific courses, books, equipment, parking spaces, or meals—and giving that instance a price. Once the fee has been created, users will be prompted to pay the fee when they complete a transaction involving the item attached to the fee. In some embodiments, a third-party payment processing service (such as Authorize.net, PayPal, Google Pay, etc.) is used to process transactions, and administrators must have entered their correct bank information into the administrative area of the fees module in order to have the payments flow to the correct bank account. If a user's payment is processed automatically, the status of the payment on the user's profile is updated; however, payments can also be processed manually (which is required if the fee is being adjusted or waived for an individual, e.g., due to financial need), and in that case, the administrator will mark the payment as paid or unpaid.

Course Evaluations

Administrators use course evaluations as one metric by which to judge the quality of a course and/or teacher. Students and/or parents may also use evaluations when selecting courses in which to enroll.

Administrative users may create course evaluations by giving an evaluation a name and then creating questions. Questions may take the form of multiple choice, scale, or free response. A scaled response is when the user is asked to rank something from low to high (e.g., on a scale of 1-10). Users enter the text of the question, choose the answer mode, and enter answer options if required. Once the evaluation has been completed, the user can assign the evaluation to specific courses and choose dates during which the responses to the evaluation will be accepted.

During the period when responses are accepted, users will see links to the evaluation(s) for their courses on their profile or portal page, based on where the administrator has posted the evaluations widget. The user will click the link of any evaluation and complete it.

Administrators may view anonymized results of the evaluation and read the full text of free-response results. Results are published to the course catalog in the same format to allow students and parents to view the results when selecting courses in which to enroll.

Triggers

A trigger is an automated way of alerting an individual when a certain event occurs. Available triggers in the platform 102 may relate to attendance, behavior, and grades. Other triggers are possible however. Administrators set triggers in the appropriate module to which the trigger relates; thus, attendance triggers are set in the attendance module.

To create a trigger, a user provides a name and description. Then, the user provides the trigger criteria. For attendance, a user may set criteria to recognize a student receiving a specific mark a certain number of times (consecutively or not). For behavior, a user may set criteria to recognize a student being cited for a specific incident a certain number of times. And, for grades, a user may set a trigger for a student receiving any grade below a certain percent, missing an assignment due date, or having a course grade fall below a certain percent. Having chosen the criteria, the administrator must next indicate one or more people to notify as a result of the trigger (the student, his/her parent, his/her counselor, adviser, or case manager, or a specific person by name). Finally, the user will set the notification text to send when the criteria are met.

Once the triggers have been set, a cron job on the server monitors the criteria and sends trigger messages as appropriate. When one message is sent, any applicable counters are reset.

Scheduled Reports

School administrators require summary information at various times, usually for state reporting or billing purposes. The platform 102 may provide users with a selection of summary reports. One example of a summary report is an attendance report, which lists the users and the marks they received during a specific time period, which may be the last week or the last month, etc. In order to schedule a report, the user will select the target report, one or more recipient, and indicate when the report should be sent (e.g., on the first of each month, every Friday at 3 p.m., etc.). Once the report schedule has been set, a cron job on the server monitors the criteria and sends reports as appropriate to the individuals specified.

Human Resources: Time Sheets and Leave Requests

Time sheets are an important part of paying staff members, and leave requests help ensure that staff abide by guidelines for allowed time off.

To set up the time sheets module, an administrative user need only define billing periods and programs. A billing period has a name, start date, and end date. A program simply has a name. A user submits a time sheet entry by selecting a billing period, a date the hours were worked, a start time, end time, program, and optionally, some comments. The user can also submit a time sheet entry as paid sick leave in order to subtract those hours from his/her allotment. The employee will create a new entry for each date worked during the billing period. A payroll coordinator or other administrative user will be able to access the time sheet summary widget in order to view time sheet entries (with hours totaled) either by employee or by program in order to issue payments for the billing period.

To set up the leave requests module, an administrative user must define the reasons for which leave requests are accepted and assign each employee to a supervisor. When an employee submits a leave request, s/he will enter a start and end date, a reason for the requested leave (e.g., bereavement, jury duty, personal, vacation, etc.), and any comments. The leave request show with status as "pending" until a supervisor has approved it, and approved leave requests will subtract time from whatever limits an administrator has set for each type of allowed leave.

Professional Development Micro-Accreditation

As educational resources become more constrained, fewer schools are paying for staff to take post-graduate university courses; instead, professional development is more often taking the form of workshops and seminars led by guest experts. These events are often sponsored by the school district or another educational organization (e.g., a non-profit), and thus, unlike a university, these organizations are not able to accredit their professional development offerings. The school districts that send their staff to these offerings value the offerings but have little way to track who has completed which types of offerings over time, and there is little visibility for school administrators in which professional development offerings actually impact teachers' classroom practices or student performance.

To solve this problem, administrative users may implement the micro-accreditation, or "badge," module, which allows staff to earn badges for completing different kinds of continuing education/professional development offerings. The organization offering the badge—usually a school district—will define the badge by providing a name, description, and badge image that will be displayed on the profiles of users who have earned them. Once the badge has been created, an administrative user may add requirements to the badge. A requirement may include an artifact, assessment, assignment, observation/evaluation, a reading, a teaching experience, or a workshop/course. Once a badge has been fully defined, individual teachers/staff members may select a badge to pursue. Most of the time, pursuing a badge will require a fee, so users will pay to pursue the badge at the time they select it. If the school district chooses to provide staff a bonus for earning the badge, the salary impact information will be displayed on the badge detail page along with the requirements to earn it.

When a user signs up to pursue a badge, that badge will appear on his/her profile in the "my badges" widget with an indication that the badge is in progress. As the user completes the requirements to earn the badge, evidence for those requirements will become available by clicking on the badge. For instance, if a user enrolls in a course through the platform 102, the course completion record will be available. If the user has completed an assessment, the assessment results will be available. If the user has submitted an artifact, such as a video, that video will be available for viewing. Once the user has submitted something for each requirement for the badge, a designated person in that user's district will review the evidence and determine whether or not the user has earned the badge. If the user has earned the badge, that status change will be reflected in the "my badges" widget, and the district's administrative listing of individuals who have earned the badge will be updated (likely affecting the individual's salary accordingly). If the district is using assessment analytics, the students can be grouped by teachers who have completed specific professional development offerings versus those who have not, thus providing administrators some insight into how different offerings impact student performance.

Bulk Import/Export/Edit

Managing the data in a large system can be difficult because there are so many modules and widgets and different places to enter and edit data. Thus, having functions available to enter, edit, and export data in bulk are important and save administrative users significant time.

The platform 102 may provide bulk import functions to import new users (students, staff, and parents), and new courses, buildings, rooms, contact information, enrollment history records, and historical grade level records, or other types of records. An administrative user will first select the type of record s/he would like to import. The next screen will show the user how to format a spreadsheet with the records to be imported; the user may download a sample spreadsheet if desired. The user will then upload his/her information and submit it for error checking. On the next screen, the user will be able to review his/her information once more before proceeding with the import; if the system's error checking has found any problems, the user will not be able to proceed but rather will be directed to fix his/her spreadsheet and return to the upload step. Errors are highlighted in various colors with messages explaining what is wrong; usually, the error is due to a formatting or validity issue. If the system has found no errors, then the user may proceed with importing the records.

The platform 102 may also provide bulk edit functions in order to allow the user to change many records at the same time rather than having to visit each user's portal page, for example, to change addresses or grade levels or similar data. The platform 102 may provide bulk edit functions for various types of records such as users (students, staff, parents, etc.) and courses. An administrative user will first select the type of record s/he would like to edit. On the next screen, s/he will select the particular field(s) s/he would like to edit; at this point, the user can also select a variety of filters in order to narrow the number of records that s/he will edit (e.g., all users whose last names begin with a particular letter or all boys or some combination of multiple filters). After having selected the specific records to edit and the fields to edit, the next screen will display those records and those fields on one screen. The user will be able to easily edit all of these records, as if editing a spreadsheet, all from the same screen. The user may also select multiple records by checking a box next to each desired record and change the same value for all selected records at once. For instance, if the user wanted to select all student records in the 10th grade and change all of the grade levels to the 11th grade, this process would facilitate that goal.

The platform 102 also allows for changing grade levels in bulk (e.g., using a bulk promotion script). The administrative user is able to define rules stating how users move from grade to grade through an organization. This can be as simple as from grade 6 to grade 7 but can also be more complicated, as in from grade 8 at school X to grade 9 at school Y. After having defined the rules, a bulk promotion script will move the students as appropriate as well as their linked parents, synchronizing all school memberships.

Additionally, the platform 102 may include bulk export capabilities. Beneficially, the bulk export capabilities allow users to get their data out of the platform 102 entirely in order to submit it to a third party or to perform other calculations by using spreadsheet software. The administrative user can choose which records to export using a variety of filters and then choose which fields to export, and the platform will generate either a formatted report (e.g., using HTML or PDF files) or a comma separated value (csv) file for the user to download. In some embodiments, the reports may be exported using other formats or file types as well. This reporting/exporting platform has been designed as an agnostic report generator that takes a filter input (defining field options) and calls functions to generate a data array and a view of the data. Thus, to create a new report, one need only program the filter inputs and write the necessary queries and view code into these functions without changing the actual report generator.

Permissions

Because the platform 102 includes many parts and much sensitive information, it may beneficial to limit access to information only certain authorized users. The platform 102 may include a permissions module to help an administrative user control which users may view, edit, and delete specific types of information. The permissions module contains two steps and operates using a wizard to guide an administrative user through selecting the best options for his/her organization.

In the first step, the administrator will create (or edit) a permissions group. A permissions group is a group of individuals who will have the same authorizations. The administrator will name the group and then decide which users are included in the group. The administrator may add users to the group based on a role (e.g., all students or all staff), a position (e.g., all guidance counselors), or membership in a department or group, and individuals currently in that role/position/group or those who take on that role/position later will be in that permissions group. The administrator could also add specific individuals to the group.

In the second step, the administrator will choose the kinds of access users in the selected permissions group will have to each widget or collection of widgets in the system, of which possible access types are: view, edit, or delete.

Beyond these steps, the administrative user may further constrain permissions based on users' relationships to one another. For example, staff members may be able to view student data but not staff data relating to other staff members. As another example parents may be able to view only their own child's data.

Figure 7:
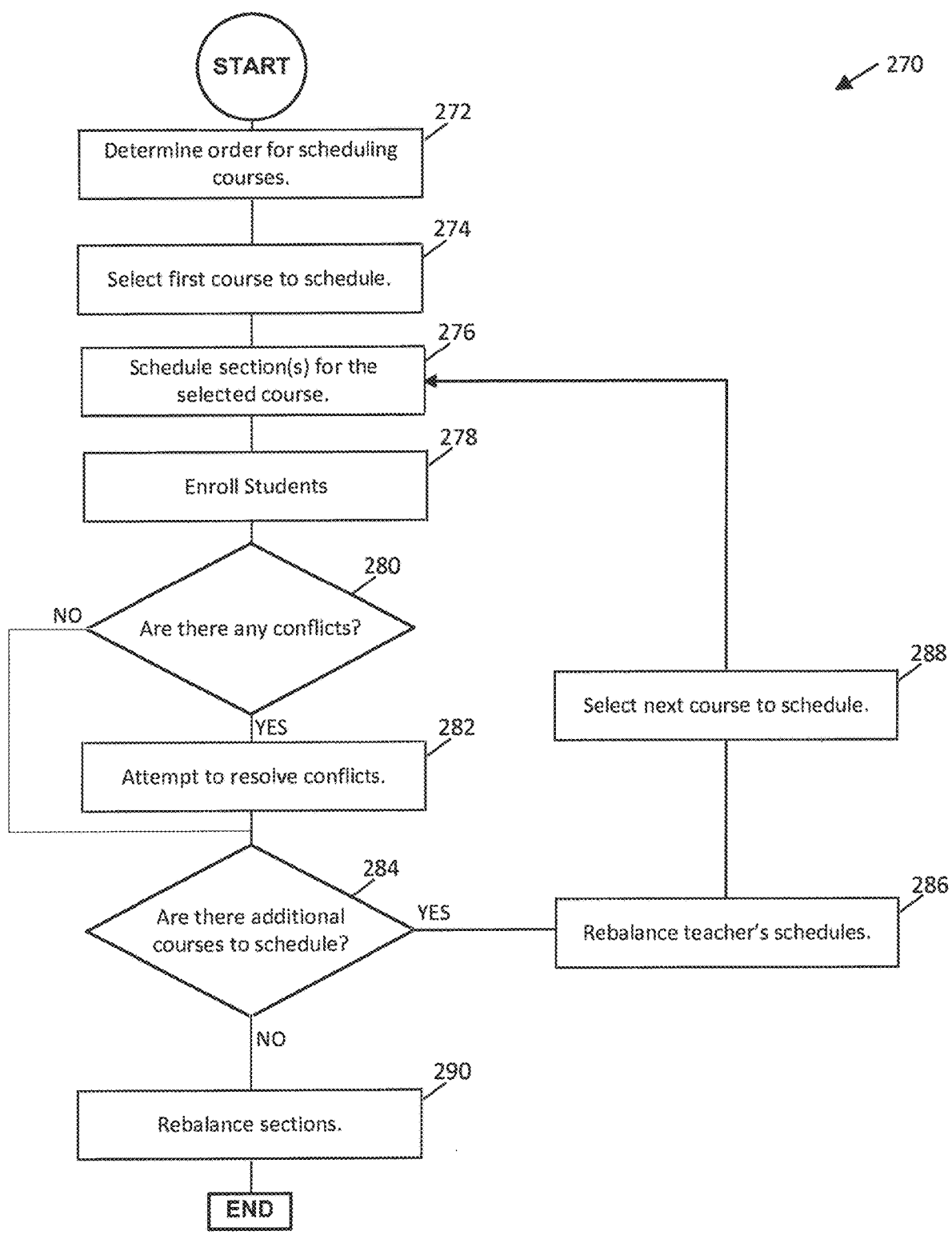
FIG. 7 illustrates an example method for building a course schedule for an educational institution with the system of FIG. 1.

FIG. 7 illustrates an example method 270 for building a course schedule for an educational institution with the system 100. In some embodiments, the method 270 includes operations 272, 274, 276, 278, 280, 282, 284, 286, 288, and 290. In some embodiments, the method 270 is performed by a course (or class) scheduling engine of the learning network engine 116.

In other embodiments, the operations of the method 270 can be performed in different orders. In yet other embodiments, the method 270 includes additional operations. In yet other embodiments, the method 270 includes only one or some of the operations 272, 274, 276, 278, 280, 282, 284, 286, 288, and 290.

At operation 272, an order is determined for scheduling courses. In some embodiments, a set of courses is ordered based on the number of sections of that course that are estimated to be scheduled. For example, in some embodiments, the courses are ordered from fewest number of estimated sections to most number of estimated sections.

The number of sections estimated for a course may be pre-defined by the educational institution or calculated based on the number of students requesting the course or who are required to take the course. In some embodiments, sections for some courses may be combined (e.g., to lower the number of sections that need to be scheduled) based on the number of students requesting the course or the number of teachers or rooms available for the course, etc. Additionally, in some embodiments, courses are eliminated (or identified for potential elimination) if the number of students requesting the course is below a pre-determined threshold. In some embodiments, the courses are re-ordered for scheduling if section are eliminated or combined.

In some embodiments, courses are further re-ordered according to additional criteria. For example, within groups of courses that are estimate to offer the same number of sections, courses with a higher global priority (e.g., as may be set by an administrator of the educational institution) are reordered ahead of other courses with a lower global priority. As another example, within groups of courses that have a similar number of estimated sections (e.g., within one section, or within two sections, etc.), sort courses based on term length so courses with a longer term length are scheduled ahead of courses with a shorter term length.

Additionally, in some embodiments, courses are reviewed to identify courses with a large number of students in common. These courses may be sorted ahead of other courses so that they may be scheduled together. Similarly, in some embodiments, courses with a common teacher are sorted ahead of other courses and scheduled together.

In yet other embodiments, courses that are offered in opposing terms are grouped together for scheduling purposes and treated as a single course with a longer, combined term. Additionally, in some embodiments, courses that have only one or two possible meeting times (e.g., due to teacher, course, or other constraints) are sorted ahead of other courses.

At operation 274, a first course is selected for scheduling. Although alternatives may be possible, the first course selected for scheduling is the course determined to be first according to the order determined in operation 272.

At operation 276, one or more sections for the selected course are scheduled. In some embodiments, the course scheduling engine filters lists of one or more of students, teachers, and rooms to show only those students who have requested the selected course, teachers who can teach the selected course, and rooms that can hold the selected course. Further, in some embodiments, the scheduling engine generates a user interface to display the availability (e.g., free or busy) of the members of at least one of the filtered list of students, teachers, and rooms. Example user interfaces are disclosed herein, including at FIGS. 8-12. In some embodiments, the learning network engine 116 receives inputs from a user, such as an administrator of the educational institution, to schedule one or more sections of the selected course at a time (e.g., based on the presented schedule), including selecting an available room and an available teacher for the section. In some embodiments, the user interface is updated as sections are scheduled and students are enrolled (as described with respect to operation 278) to show the students that still need to be enrolled and to update the availability of teachers and rooms. Additionally, in some embodiments, the learning network engine 116 operates to automatically select (or suggest) periods for sections by selecting a period with an available teacher and available room that maximizes the number of requesting students that can attend.

Further, in some embodiments, when the selected course has multiple sections, the class scheduling engine is biased to select (or suggest) scheduling the sections that are each in different periods or terms from one another. Additionally, when the selected course is not the first course to be schedule, the class scheduling engine may be biased to select (or suggest) periods that already have other courses scheduled. Additionally, if the selected course had a smaller term (e.g., it does not span the full academic year), the class scheduling engine may try to schedule selected course during the same period as other already scheduled courses that also have smaller terms. In this manner, courses that have smaller terms are concentrated during a few periods of the day, leaving open other periods for longer term courses. Additionally, in some embodiments, courses with no (or few) shared resources (e.g., students, rooms, teachers, etc.) are scheduled for the same period when possible. Additionally, in some embodiments, a teacher with a higher priority ranking (e.g., as set by an administrator, based on demand, based on suitability for the selected course, etc.) are initially selected as the teacher for the sections of the selected course ahead of other teachers with lower priority rankings. Based upon the above factors, the schedules of requesting students, and, in some embodiments, other factors, periods are selected for sections of the selected course.

At operation 278, students are enrolled in the scheduled sections of the selected course. For example in some embodiments, students are placed in each section so that there is approximately an equal number of students in each section. Further, students may be placed in sections, to match any uniformity requirements. Further, some embodiments ensure that students who cannot be placed in a certain section of a request course are placed in another section of that course. For instance, if the selected course has scheduled sections in periods three and five, all students who cannot take the course in period three (e.g., are already scheduled during period three, etc.) are assigned to period five and vice versa. The remaining students may be assigned randomly to the sections. Additionally, some embodiments, attempt to achieve balance with regard to race, gender, grade level, house (or any other type of division of the school), or any other characteristic identified and ranked by the educational institution.

At operation 280, it is determined whether there are scheduling conflicts based on the periods in which the sections of the selected course are scheduled. An example of a scheduling conflict is when a student who has requested a course is enrolled in another course during all of the scheduled periods for that course. If there are scheduling conflicts, the method proceeds to operation 282. If not, the method proceeds to operation 284.

At operation 282, scheduling conflicts are resolved, if possible. In some embodiments, the conflicting students are moved to another sections of a different enrolled course to eliminate the scheduling conflict (thereby freeing up the previously occupied period so the student can enroll in the course). Further, in some embodiments, the conflicting section(s) are moved to another period (and potentially teacher/room/group of students) if doing so results in fewer or less severe scheduling conflicts. Further, one or more additional sections of the course may be added to address the scheduling conflicts.

Additionally, some embodiments evaluate the severity of scheduling conflicts that have not been otherwise resolved by determining whether any of the scheduling conflicts relate to required courses or enable future courses in a multiyear plan by serving as prerequisites. If so, some embodiments, perform section swaps (e.g., where the period of one course is swapped with the period of another course) to eliminate the high-severity scheduling conflict.

At operation 284, it is determined whether there are additional courses to schedule. If so, the method proceeds to operation 286. If not, the method proceeds to operation 290.

At operation 286, teacher's schedules are re-balanced (e.g., by swapping, shifting, or changing the teacher assigned to a particular section of a course) to comply with policies or goals of the educational institution (e.g., that a teacher not teach more than a predefined number of sections in a row, etc.).

At operation 288, the next course is selected for scheduling based on the order determined in operation 272. The method then returns to operation 276 to schedule this newly selected course.

In some embodiments, operation 290 is performed after all courses have been scheduled. At operation 290, the balance of gender, race, and other characteristics identified/ranked by the educational institution is re-checked and, if necessary, re-balanced. In at least some embodiments, the balance of a particular characteristic is re-balanced in a section by swapping students from one section of a course to another section of that same course when the students' schedules allow doing so without creating scheduling conflicts. Additionally, in some embodiment, sections are rebalanced to achieve approximately equal number of students in each section by similarly swapping students (e.g., within a predefined threshold, such as within five, or within ten percent).

Figure 8:
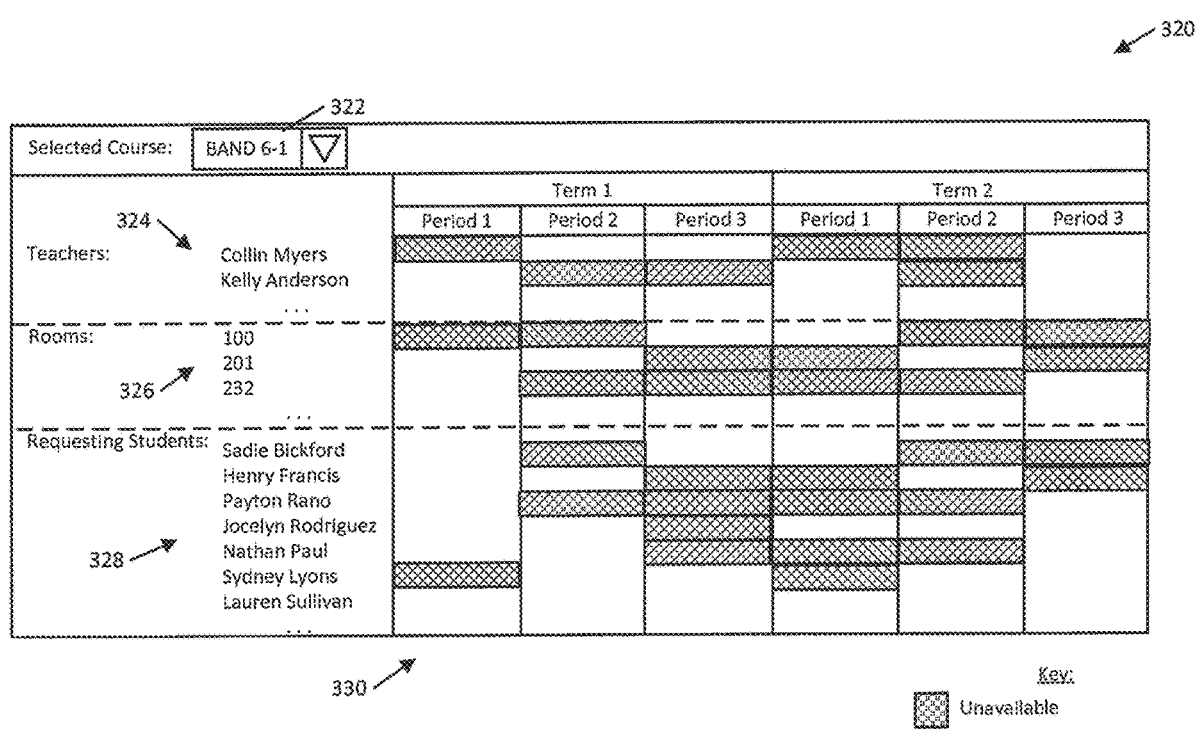
FIG. 8 illustrates an example screen of an example user interface generated by some embodiments of the interface engine of FIG. 3.

FIG. 8 illustrates an example screen 320 of an example user interface generated by some embodiments of the interface engine 194. The screen 320 may be used to build a schedule for an educational institution.

The screen 320 includes a selected course identifier 322, a teacher list 324, a room list 326, a student list 328, and a scheduling grid 330. Some embodiments include additional, different, or fewer elements. For example, some embodiments may not include the room list 326. Additionally, some embodiments may include a resource list of other resources that need to be scheduled for use in courses.

In some embodiments, the selected course identifier 322 shows the name of the course currently selected for scheduling. Other information about the selected course may be shown as well. In some embodiments, the selected course identifier 322 is a user-actuatable control such as a dropdown box, which when actuated presents a list of course. In these embodiments, a user may select a different course to schedule (or review) using the selected course identifier 322. The dropdown box may order the courses in the list according to a pre-determined order for scheduling courses (e.g., as illustrated and described with respect to at least operation 272 of FIG. 7), alphabetically, by similarity, or in another manner.

The teacher list 324 presents a list comprising one or more teachers who can teach the selected course. In at least some embodiments, the teacher list 324 is updated and refreshed when a different course is selected for scheduling. The teachers included in the teacher list 324 may be identified based on teacher-course association data stored in the database 106 or elsewhere. In some embodiments, if a teacher's name is clicked or otherwise actuated, a teacher information screen may be displayed that includes various scheduling information for the teacher, such as the courses the teacher is currently schedule to teach. An example teacher information screen 370 is illustrated in FIG. 10. Other embodiments may include additional, different, or less information than is shown in FIG. 10.

The room list 326 presents a list comprising one or more rooms that are suitable for holding the selected course. In at least some embodiments, the room list 326 is updated and refreshed when a different course is selected for scheduling. The rooms included in the room list 326 may be identified based on room-course association data stored in the database 106 or elsewhere. In some embodiments, if a room name/number is clicked or otherwise actuated, a room information screen may be displayed that includes various scheduling information for the room, such as the courses currently scheduled in the room.

The student list 328 presents a list comprising one or more students who have requested the selected course. In at least some embodiments, the student list 328 is updated and refreshed when a different course is selected for scheduling. Additionally, in some embodiments, the student list 328 shows only those students who are requesting the course and have not yet been scheduled in the course. The students included in the student list 328 may be identified based on student-course association data stored in the database 106 or elsewhere. In some embodiments, if a student's name is clicked or otherwise actuated, a student information screen may be displayed that includes various scheduling information for the student, such as the courses the student has requested and courses in which the student is currently scheduled. An example student information screen 390 is illustrated in FIG. 11. Other embodiments may include additional, different, or less information than is shown in FIG. 11.

The scheduling grid 330 shows the availability of the teachers in the teacher list 324, the rooms in the room list 326, and the students in the student list 328. The grid includes columns for multiple terms and multiple periods within those terms. Although not shown in FIG. 11, other embodiments also include days or other scheduling units as well. The scheduling grid 330 indicates when a teacher, room, or student is unavailable (e.g., currently scheduled, busy, or otherwise unavailable) during a particular period. In some embodiments, the scheduling grid 330 also includes information about why the teacher, student, or room is unavailable, such as the name of another course. Based on the information presented in the scheduling grid 330, a teacher and room can be assigned and students can be enrolled in a section of the selected course. In some embodiments, a teacher and period are assigned by clicking in an appropriate location on the scheduling grid 330. Additionally, in some embodiments, a room can be selected similarly as well.

Students can also be enrolled by clicking an appropriate location in the scheduling grid 330 (e.g., at the intersection of the students row and column corresponding to the selected period). In some embodiments, keyboard shortcuts can also be used to enroll students. For example, actuating the down arrow key may enroll the next student available at the selected time, while actuating the down arrow and the shift keys concurrently may enroll the next ten students available at the selected time. Additionally, in some embodiments, a student may be un-enrolled from a course with a keystroke and click combination, such as by shift-clicking in the appropriate location of the scheduling grid 330. In some embodiments, the student list 328 is sorted to show students who are available during the selected period at the top of the list or to show students enrolled in a particular section together.

Figure 9:
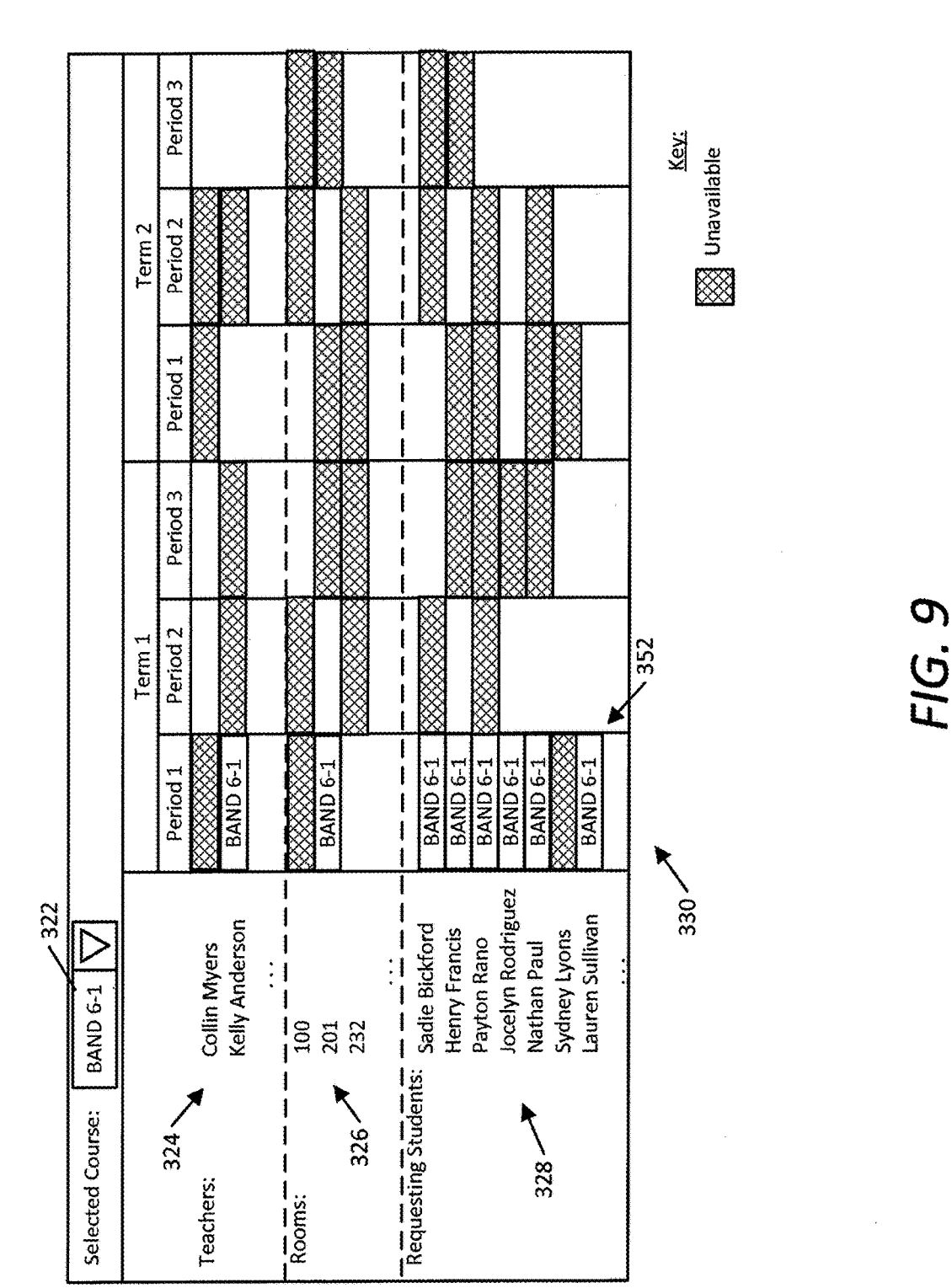
FIG. 9 illustrates an example screen of an example user interface generated by some embodiments of the interface engine of FIG. 3.

FIG. 9 illustrates an example screen 350 of an example user interface generated by some embodiments of the interface engine 194. The screen 350 may be displayed as students are being enrolled in a particular selected course.

The example screen 350 is similar to the example screen 320, except that the scheduling grid 330 includes indicators, such as indicator 352, that indicate the teacher and room assigned to a particular section of a course and the students enrolled in that section. In some embodiments, the indicators may highlight portions of the scheduling grid 330 (such as with a bright color). Additionally, when a course has multiple sections, the indicators may be visually distinct for at least some of the multiple sections (e.g., using a different background color, font color, or font style, etc.)

Figure 12:
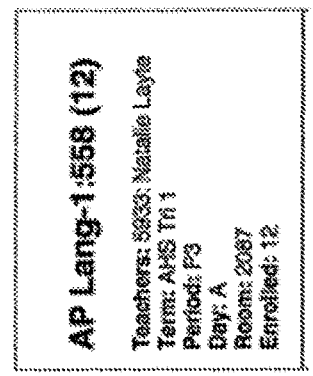
FIG. 12 illustrates an example section information screen of an example user interface generated by some embodiments of the interface engine of FIG. 3.

In some embodiments, if a section is clicked or otherwise actuated in the scheduling grid 330, a section information screen may be displayed that includes various information about the section, such as the teacher, the room, the term, the period, and the number of students enrolled. An example section information screen 410 is illustrated in FIG. 12. Other embodiments may include additional, different, or less information than is shown in FIG. 12.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for building a course schedule for an educational institution and enrolling students in courses based on their requests, the system comprising:
    a database comprising data in a single, standard format wherein the data includes at least administrative settings received from an administrative computing device and a plurality of student course requests received from a plurality of student computing devices;
    at least one processing device comprising instructions that, when executed by the at least one processing device, cause the at least one processing device to:
        generate an online educational portal, the online educational portal comprising at least a plurality of widgets configured to access and modify the data in the database to perform a plurality of functions within the educational institution, the plurality of widgets at least comprising:
        a class scheduler engine configured to:
            access administrative settings from the database, the administrative settings including at least timeslot availability, teacher availability, and room availability;
            access the plurality of student course requests from the database;
            estimate a number of sections of each course that will be needed to satisfy student course requests;
            determine an order for scheduling each of a plurality of courses, wherein the order for scheduling each of the plurality of courses is determined by the estimated number of sections of each course and the number of possible meeting times, wherein courses that only have one or two possible meeting times are sorted ahead of other courses;
            schedule each of the plurality of courses in the determined order, wherein scheduling each of the plurality of courses includes:
            for each section of the course:
                determining a timeslot based on availability of teachers qualified to teach the course, rooms suitable to hold the course, and students requesting the course;
                upon determining a timeslot, enrolling the students requesting the course into the section of the course;
                upon enrolling the students, determining whether there are any scheduling conflicts; and
                if there are scheduling conflicts, resolving the scheduling conflicts when possible;
            after all of the plurality of courses are scheduled, save the scheduled courses in the database.

2. The system of claim 1, wherein the timeslot availability is defined by one or more of terms, days, periods, bell schedules, and a meeting pattern.

3. The system of claim 1, wherein the number of sections of each course that will be needed to satisfy student course requests is calculated based on the number of students requesting the course.

4. The system of claim 1, wherein the order for scheduling each of the plurality of courses is determined by:
    ordering the courses by the number of estimated sections from smallest to largest;
    optionally combining two or more sections of one course based one or more of the number of students requesting the course, the number of teachers available, and the number of rooms available;
    optionally eliminating one or more courses when the number of students requesting the course is below a pre-determined threshold; and
    re-ordering the courses if any sections or courses are eliminated.

5. The system of claim 4, wherein the order for scheduling each of the plurality of courses is further determined by reordering the courses based on the following:
    courses having higher global priority are reordered ahead of other courses having the same number of sections;
    courses having a longer term length are reordered ahead of courses having shorter term length when there are the same number of sections of those courses;
    courses having more students in common are reordered ahead of other courses;

courses having a common teacher are reordered ahead of other courses;

courses taught by teachers having higher priority rankings are prioritized;

courses having no or few shared resources are scheduled in the same periods whenever possible; and courses that are offered in opposing terms are grouped together for scheduling purposes and treated as a single course with a longer combined term.

6. The system of claim 1, wherein determining a timeslot for each section of the course is based on the following:

scheduling sections of the same course in different periods or terms from one another;

scheduling sections of a course during periods that already have other courses scheduled;

scheduling courses having smaller terms during the same periods;

scheduling courses having few or no shared resources during the same periods; and scheduling sections of a course taught by a teacher with a higher priority ranking before sections of the course taught by a teacher with a lower priority ranking.

7. The system of claim 1, wherein enrolling the students requesting the course into sections of the course comprises:

placing students in each section so that there is approximately an equal number of students in each section of a course;

placing students in sections to match uniformity requirements;

placing students that cannot be placed in a certain section of a course in another section of that course; and placing remaining students randomly in sections.

8. The system of claim 1, wherein the conflicts are resolved by one or more of the following:

moving a student to another section of an enrolled course;

moving a section to another time slot; and adding a section to a course.

9. The system of claim 1, wherein the educational institution includes two or more school buildings having two or more different schedules of timeslot availability.

10. The system of claim 1, wherein the plurality of courses are further scheduled by re-balancing sections by swapping students from one section of a course to another section of the course to comply with policies of the educational institution and ensure that there are approximately equal number of students in each section.

11. A computer-implemented method of building a course schedule for an educational institution, the method comprising:

generating an online education portal, the online educational portal comprising at least a plurality of widgets configured to access and modify data in a database, wherein the data is in a single standard format, to perform a plurality of functions within the educational institution, the plurality of widgets at least comprising a class scheduler engine;

using the class scheduler engine:

accessing, from the database that includes the data in the single, standard format, student course requests and administrative settings, the administrative settings defining possible teachers, rooms, and timeslots that will be available for a given term;

estimating a number of sections of each course that will be needed to satisfy student course requests;

automatically determining, using a computing device, an order for scheduling courses, the order ranking courses from smallest number of estimated sections to largest number of estimated sections and the order also ranking courses that only have one or two possible meeting times ahead of other courses;

generating a user interface on an administrator computing device, the user interface being configured to display availability of students, teachers, and rooms for scheduling courses on a grid;

scheduling for each course according to the order, wherein scheduling each of the courses includes scheduling all sections of the course before proceeding to schedule the next course according to the order, including for each course:

automatically scheduling one or more sections of the course in an available room, with an available teacher, at a time that is best based on the schedules of students requesting the class;

upon scheduling the one or more sections of the course, automatically enrolling students into the scheduled one or more sections of the course;

upon enrolling the students, determining whether any scheduling conflicts are present for the time in which the one or more sections of the course will be held;

resolving conflicts by moving students to different sections or changing the time of the sections; and after all courses are scheduled, storing the scheduled courses and enrollment in the database.

12. The method of claim 11, wherein the conflicts are solved automatically.

13. The method of claim 11, wherein the conflicts are solved by user input received through the user interface.

* * * * *